(12) United States Patent
Takeuchi

(10) Patent No.: US 7,688,695 B2
(45) Date of Patent: Mar. 30, 2010

(54) METHOD OF WRITING MULTI-LEVEL DATA USING ADJUSTED RECORDING WAVEFORM

(75) Inventor: Kohji Takeuchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 959 days.

(21) Appl. No.: 11/080,651

(22) Filed: Mar. 16, 2005

(65) Prior Publication Data
US 2005/0213465 A1  Sep. 29, 2005

(30) Foreign Application Priority Data
Mar. 18, 2004 (JP) ............................. 2004-079283
Nov. 9, 2004 (JP) ............................. 2004-325608

(51) Int. Cl.
*G11B 7/0045* (2006.01)
(52) U.S. Cl. .................................. 369/59.11
(58) Field of Classification Search ............. 369/59.1, 369/59.11, 59.12
See application file for complete search history.

(56) References Cited

U.S. PATENT DOCUMENTS

| | | | | | |
|---|---|---|---|---|---|
| 6,018,508 | A | * | 1/2000 | Hasegawa | 369/59.11 |
| 6,205,102 | B1 | * | 3/2001 | Spruit | 369/59.11 |
| 6,404,712 | B1 | * | 6/2002 | Lee et al. | 369/47.53 |
| 6,459,666 | B1 | * | 10/2002 | Yokoi | 369/47.15 |
| 6,631,109 | B2 | * | 10/2003 | Nakamura | 369/59.11 |
| 6,714,230 | B2 | | 3/2004 | Shimizu | |
| 6,888,479 | B2 | | 5/2005 | Sakagami et al. | |
| 7,130,256 | B2 | | 10/2006 | Toda et al. | |
| 2001/0043539 | A1 | * | 11/2001 | Kuribayashi et al. | 369/59.11 |
| 2001/0053115 | A1 | * | 12/2001 | Nobukuni et al. | 369/59.12 |
| 2002/0064117 | A1 | * | 5/2002 | Kato et al. | 369/59.11 |
| 2002/0080702 | A1 | * | 6/2002 | Asada et al. | 369/59.1 |
| 2003/0063542 | A1 | * | 4/2003 | Ohno | 369/59.11 |
| 2003/0067856 | A1 | * | 4/2003 | Toda et al. | 369/59.11 |
| 2003/0112667 | A1 | | 6/2003 | Shimizu et al. | |
| 2003/0169666 | A1 | | 9/2003 | Sakagami | |
| 2003/0210634 | A1 | | 11/2003 | Shimizu | |
| 2004/0009371 | A1 | | 1/2004 | Sakagami et al. | |
| 2004/0027958 | A1 | | 2/2004 | Takeuchi et al. | |
| 2004/0085878 | A1 | | 5/2004 | Sakagami et al. | |
| 2004/0100883 | A1 | | 5/2004 | Sakagami | |

FOREIGN PATENT DOCUMENTS

| JP | 01-154328 A | 6/1989 |
|---|---|---|
| JP | 10-134353 | 5/1998 |
| JP | 2002-237040 A | 8/2002 |
| JP | 2003-91822 | 3/2003 |
| JP | 2003-123252 A | 4/2003 |

OTHER PUBLICATIONS

Japanese Notice of Rejection, Oct. 13, 2009.

* cited by examiner

*Primary Examiner*—Wayne R Young
*Assistant Examiner*—Thomas D Alunkal
(74) *Attorney, Agent, or Firm*—Dickstein Shapiro LLP

(57) ABSTRACT

A method of writing multi-level data to a recording medium is disclosed. The multi-level data is written by the emission of light beam. The method is characterized in that a write waveform that controls the emission of the light beam includes a first top pulse, an off pulse, and an erase pulse. The method is further characterized in that, if the value of the multi-level data falls in a predetermined range, a second top pulse is inserted between the first top pulse and the erase pulse of the write waveform that controls the emission of the light beam to write the value.

21 Claims, 16 Drawing Sheets

MULTI-LEVEL DATA
n = 1∼3

MULTI-LEVEL DATA
n = 4∼7

TEST REFLECTIVE LIGHT INTENSITY: V(nnn, Pw)
IDEAL VALUE: V(000, Pw)−n · {V(000, Pw)−V(777, Pw)}/7

METHOD OF WRITING MULTI-LEVEL DATA USING ADJUSTED RECORDING WAVEFORM

BACKGROUND OF THE INVENTION

1. Field of the Invention

The present invention generally relates to a method of storing information in a recording medium, and more particularly, to a method of writing multi-level data to a recording medium such as an optical disk. The present invention also relates to an information storage apparatus in which the method of storing information is used and to a recording medium in which information has been stored using the method.

2. Description of the Related Art

The recording density of an optical recording medium (optical disk) such as a Compact Disk (CD) and a Digital Versatile Disk (DVD) is desired to further increase. One approach to the further increase in the recording density of an optical recording medium is to improve the performance of an optical pickup that write and read data to an optical recording medium. Another approach is to write and read multi-level data to an optical recording medium.

In the case of phase change type optical information storage apparatus, bi-level recording in which whether a recording mark is formed in a recording unit (cell) expresses one bit is conventionally used. Multi-level recording is a technique in which a recording mark is formed in a recording unit but the length of the recording mark is controlled step-wise thereby to express multiple bits. That is, multi-level data is written by changing step-wise the ratio of amorphous mark to crystalline base in a cell, and read by detecting the intensity of reflective light from the cell.

However, since the recording properties of each optical recording medium and those of each optical information storage apparatus may vary due to individual difference and environmental change, the write power and erase power of a laser beam and time period (write pulse width) in which the laser beam of write power is emitted need to be determined taking the individual difference and the environmental change into account. For example, various techniques for determining write power are proposed.

For example, Japanese Patent Laid-Open Application No. 10-134353 discloses a technique in which test writing is repeated until ideal signal wave is obtained in order to surely reproduce multi-level data.

Japanese Patent Laid-Open Application No. 2003-91822 discloses a technique in which test writing is performed with write power being gradually changed and a write power that saturates reflective light quantity is determined as the optimal write power. This technique makes change in thermal diffusion easily detectible caused by excessive write power.

However, the conventional technique described above has the following problem. The technique disclosed in above Japanese Patent Laid-Open Application No. 10-134353 performs adjustment by loop processing including the steps of: writing and reading test data, comparing signal obtained by reading the written test data with the ideal signal waveform, determining whether the adjustment has converged (if converged, the process is terminated), and adjusting condition of laser emission. However, this technique requires the writing of test data many times and huge number of arithmetic operations, resulting in long time for test recording.

In the case of multi-level data recording system that forms a recording mark, the length of which is changed step-wise, in a recording cell, each value of the multi-level data is written in a recording cell of fixed length on a recording track 51 as shown in FIG. 25. A recording mark is formed in each recording cell 52, and the level of reproduced signal from the recording mark 53 depends on the length of the recording mark 53. When multi-level data is read, the reproduced signal from the recording mark 53 is sampled at predetermined frequency (for example, at the timing in which a reproduction light spot 54 comes to the center of the recording cell 52), and the value of the multi-level data is discriminated based on the reflective light intensity of the sampled reproduced signal. Since the spot size of the reproduction light spot 54 is longer than the length of the recording cell 52 in the circumference directions of the optical disk, interference between data written in adjacent recording cell occurs. Generally, the interference is taken into consideration when discriminating the multi-level data.

In the case of eight-level data recording system, for example, $8^3=512$ combinations need to be taken into account. Time required for arithmetic operation is not negligible. Additionally, because the above conventional technique needs to be repeated to increase accuracy, long processing time is not avoidable.

Above Japanese Patent Laid-Open Application No. 2003-91822 discloses a recording technique to determine the optimal recording condition (write power and write pulse width) easily without involving the steps of the previous conventional technique. According to this recording technique, test recording is performed with write power being varied, and write power with which the reflective light intensity saturates is determined as the optimal write power. However, this recording technique uses conventional write waveform to write multi-level data, and the following problem still remains unsolved.

The write waveform indicates how the power of laser beam is changed in time to write a single value of multi-level data. As shown in FIG. 26, a conventional write waveform includes a top pulse in which the laser beam of write power Pw is emitted for pulse width Ton, an off pulse in which the laser beam of bias power Pb is emitted for pulse width Toff, and an erase pulse in which the laser beam of erase power Pe is emitted for remaining time period of the recording cell. When such write waveform is used to write different values of multi-level data, the same top pulse having the same write power Pw and the same pulse width Ton is used, but different off pulses only the pulse width of which are different are employed. That is, the length of a recording mark is determined only by the pulse width Toff of the off pulse in which the recording layer heated by the top pulse is rapidly cooled.

FIG. 27 shows relation between the write power Pw and multi-level data error rate (SER). The SER is the rate of the number of multi-level symbol errors divided by the total number of symbols. Low SER means low probability of erroneous detection of multi-level data, and the consequently accurate discrimination of multi-level data. As shown in FIG. 27, the SER draws a curve that becomes minimum at the optimal write power P0, but is not symmetric at both sides thereof. FIG. 27 shows that low power recording (Pw<P0) results in the rapid degradation (increase) of SER compared to high power recording (Pw>P0). The cause of the rapid degradation of SER is considered to be that the low power recording cannot raise the temperature of the recording layer enough, and as a result, cannot form a recording mark of desired area.

If the optimal write power P0 shifts to the high power side due to the diversity of individual product and the environmental change, but the same write power is used for recording, the SER may be increased beyond the limit in which the multi-level data cannot be read. That is, margin (power margin) at the low power side is small. The small power margin results in the following problems.

The substrate of an optical disk made of polycarbonate is not flat as a glass substrate, and may be bent and undulant. For example, if the optical disk is bent in the direction from the inner circumference to the outer circumference, the reflective light from the optical disk enters the optical pickup forming different incident angles, and as a result, the level of reproduction signal changes in dependence of the position of the optical pickup in the radial direction. If the power margin is small, SER becomes sensitive to the change in the reproduction signal. To solve this problem, various conditions such as write power needs to be determined in dependence on the position in the radial direction thereby to keep SER low. As a result, recording and reproduction processing takes long time. Additionally, some areas for test recording need to be provided in some radial positions in order to determine the various conditions such as the write power. However, the areas for test recording reduces user region, resulting in the decrease in recording capacity of the optical disk.

Furthermore, if the recording track is wound, the laser beam is defocused in a heavily wound region. The writing of data using defocused laser beam is substantially equivalent to low power recording. FIG. 27 suggests that SER would be degraded in a region in which focus servo fails locally due to great winding. As a result, if the power margin is small in the low power side, multi-level data written on some optical disks may be unable to reproduce due to divergence of each optical disk substrate.

Recently, recordable CD and DVD that can write data at higher speed than the standard speed have been developed. An example of information storage methods applied to such recordable CD and DVD includes a method of adjusting reference clock cycle of recording signal in dependence on the radial position while the disk rotative speed maintained constant in order to realize high speed CLV (Constant Linear Velocity) recording. However, if the above method is applied to the multi-level recording described above, since the recording sensitivity of the optical disk is not linear to the recording linear velocity, the recording mark formed at the inner circumference of the optical disk may be different from the recording mark formed at the outer circumference of the optical disk.

Especially, at the outer circumference of the optical disk, the recording linear speed becomes high resulting in low recording sensitivity. In the case in which low multi-level data values (1-3) is recorded, a recording mark having sufficient size can not be formed. The corresponding relation between the multi-level data and the reflective light intensity may deviate from that of standard recording linear velocity recording. As a result, multi-level discrimination level and waveform equalization factor may need to be learned for each recording linear velocity. In reproduction operation, the multi-level discrimination level and the waveform equalization factor may need to be retrieved corresponding to each linear velocity, but this process may take too long time.

SUMMARY OF THE INVENTION

Accordingly, it is a general object of the present invention to provide a novel and useful method of storing information in a recording medium in which at least one of the above problems is eliminated.

Another and more specific object of the present invention is to provide a method of writing multi-level data to a recording medium by the emission of laser beam, in which recording performance at write power lower than the optimal write power can be improved, and steady recording can be realized regardless the diversity of recording medium or apparatus and environmental change.

Yet another object is to realize steady recording even if the recording linear velocity is changed.

To achieve at least one of the above objects, according to the present invention, a method of writing multi-level data to a recording medium by the emission of light beam, is characterized in that: a write waveform that controls the emission of the light beam includes a first top pulse, an off pulse, and an erase pulse; and if the value of the multi-level data falls in a predetermined range, a second top pulse is inserted between the first top pulse and the erase pulse of the write waveform that controls the emission of the light beam to write the value.

Other objects, features, and advantages of the present invention will become more apparent from the following detailed description when read in conjunction with the accompanying drawings.

DETAILED DESCRIPTION OF THE PREFERRED EMBODIMENTS

The preferred embodiments of the present invention are described in detail below.

Figure 1:
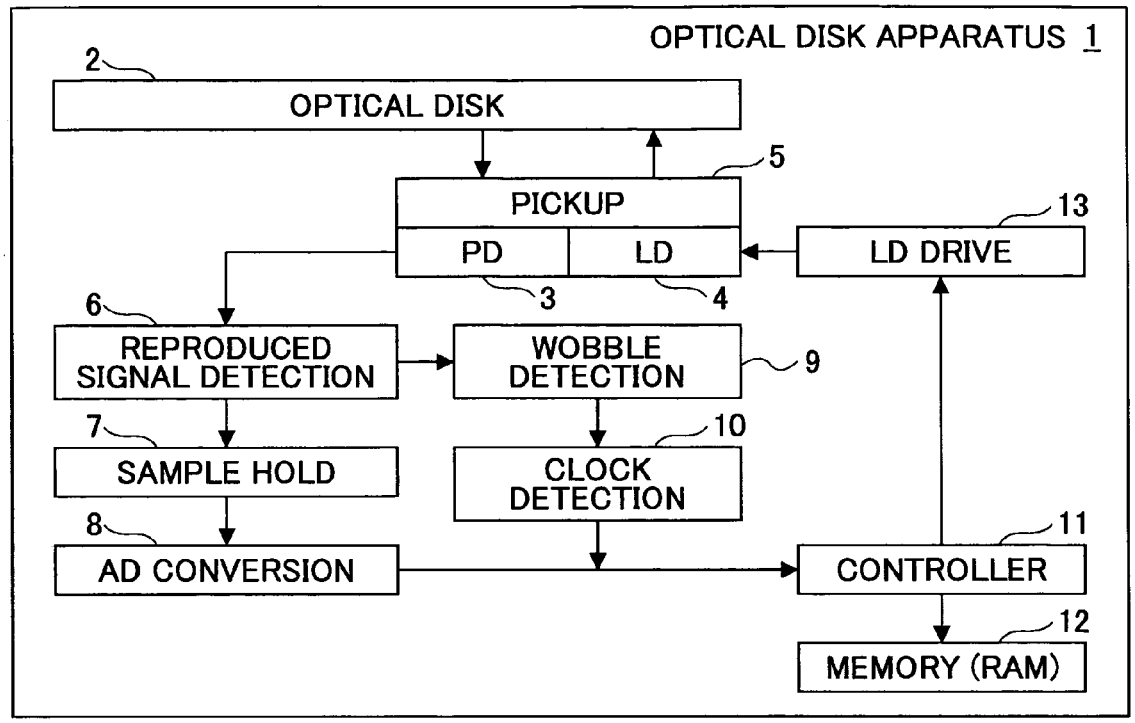
FIG. 1 is a block diagram showing an optical disk drive according to an embodiment of the present invention.
Figure 2:
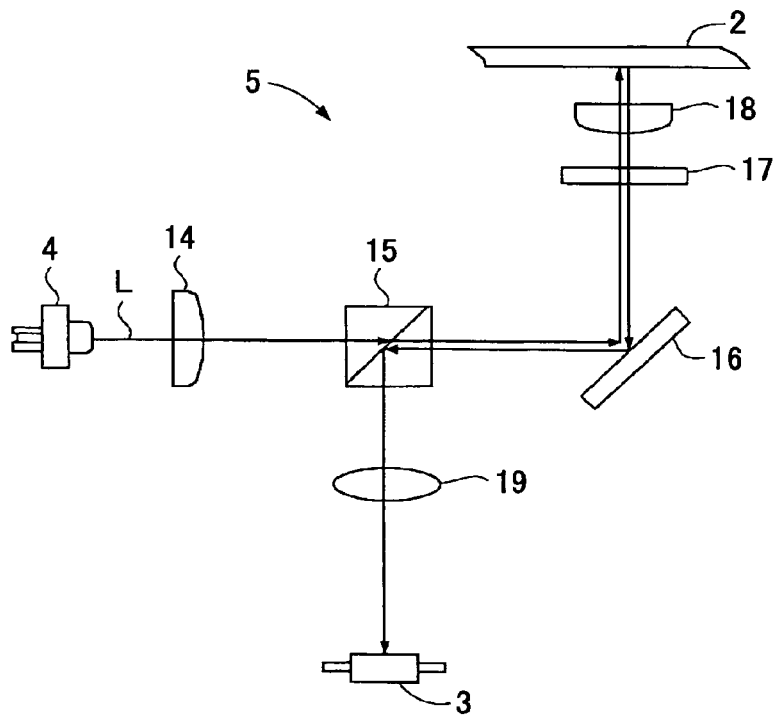
FIG. 2 is a schematic diagram showing an exemplary configuration of the optical system of a pickup shown in FIG. 1.

Embodiment of Information Storage Apparatus: FIGS. 1&2

An optical disk drive is described below as an example of an information storage apparatus according to an embodiment of the present invention. This optical disk drive can perform a method of storing information according to an embodiment of the present invention. FIG. 1 is a block diagram showing the configuration of the optical disk drive 1. FIG. 2 is a schematic diagram showing the optical system of an optical pickup 5.

The optical disk drive 1 shown in FIG. 1 writes multi-level data to an optical disk 2 using an information storage method described below. Even if optimal write power shifts to a higher level due to dispersion of individual optical disk drive 1 or individual optical disk 2 or environmental change, the optical disk drive 1 can write multi-level data accurately without setting write power again. The optical disk drive 1 is provided with an optical pickup 5 including a photo detector 3 and a laser diode 4, a reproduced signal detection circuit 6, a sample hold circuit 7, an AD conversion circuit 8, a wobble detection circuit 9, a clock detection circuit 10, a controller 11, a memory 12, and a LD drive circuit 13.

The detailed configuration of the optical pickup 5 is shown in FIG. 2. A laser beam L is emitted by the laser diode (semiconductor laser diode) LD 4, travels to the optical disk 2 via a collimator lens 14, a polarization beam splitter 15, a mirror 16, a λ/4 plate 17, and an object lens 18. A reflective light from the optical disk 2 travels to the photo detector 3 via the object lens 18, the λ/4 plate 17, the mirror 16, the polarization beam splitter 15, a detection lens 19. The photo detector 3 is divided into four portions such that the photo detector can detect a reproduced signal, a focus error signal, a track error signal, for example.

When the pickup 5 writes multi-level data to the optical disk 2, the controller 11 outputs the following information to the LD drive circuit 13: multi-level data to be written to the optical disk 2, pulse width setting information of write waveform (to be described below), and setting information for setting write power, erase power, and bias power, for example. The LD drive circuit 13 drives the laser diode 4 using modulated signal. When writing the multi-level data, the controller 11 can read pre-format information stored in the optical disk 2 as a look-up table, and further can read the setting information stored in an internal memory (not shown) of the optical disk drive 1 thereby to set an initial value of the write waveform.

An example of the pre-format information or the setting information includes parameters related to a method of storing information such as write pulse width (the pulse width of top pulse), write pulse interval, cooling pulse width, the position of the beginning and end of each pulse, write power, bias power, erase power. Information that defines the additional pattern of the second top pulse described above is preferably included.

If these parameters are changed during write operation, the look-up table may be updated based on the changed parameters. When writing data next time, the changed parameter can be used as an initial value, which results in reducing time for setting the setting information.

When written data is read, the reproduced signal is detected through photo-electric conversion by the photo detector 3, current-voltage conversion by the reproduced signal detection circuit 6, and an addition circuit. The wobble detection circuit 9 detects wobble signal from the output of the reproduced signal detection circuit 6. The clock detection circuit 10 generates PLL clock from the wobble signal, and the PLL clock is used as a clock for reproduction. This clock is the same as clock used for write operation. The level of reproduction signal at the center of each test pattern can be detected using this clock. The sample hold circuit 7 samples the detected level of reproduction signal as the reproduction signal level corresponding to each multi-level data. The AD conversion circuit 8 converts the sampled level value of reproduction signal into level data, which is stored in the memory 12 by the controller 11.

First Embodiment of Information Storage Method: FIGS. 3 through 10

An information storage method according to a first embodiment of the present invention is described below.

It is assumed that the multi-level data can take a value from 0 to 7, where value 0 corresponds to the maximum intensity of the reflective light, and value 7 corresponds to the least intensity of the reflective light. A recording mark corresponding to a value of the multi-level data can be formed by controlling the irradiation of laser beam based on the write waveform corresponding to the value of the multi-level data.

Figure 3:
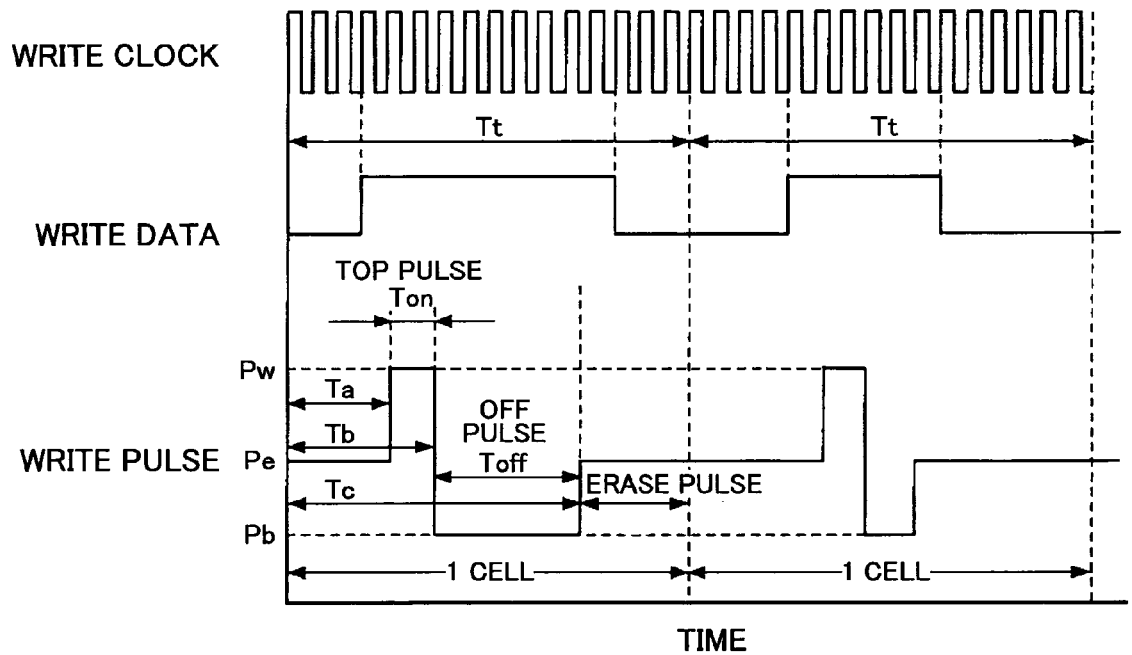
FIG. 3 is a waveform diagram showing waveforms for writing multi-level data to an optical disk.

As shown in FIG. 3, the write waveform is formed by continuous pattern of a top pulse (first top pulse), an off pulse, and an erase pulse. The top pulse is a pulse of the write power Pw, the width of which is top pulse time Ton. The off pulse is a pulse of bias power Pb, the width of which is off-pulse time Toff. The erase pulse is a pulse of erase power Pe, which continues for remaining time period other than the top pulse time Ton and the off pulse time Toff. The erase power Pe is the write power Pw multiplied by a constant $\in$, where $\in$ is usually set about $\in$=0.5.

Such a pulse sequence can be defined by time periods from write clock edge which is the reference of the beginning of each cell period Tt to the rise of the write pulse (write pulse rise time period Ta), to the fall of the write pulse (write pulse fall time period Tb), and to the rise of the erase pulse (erase pulse rise time period Tc). The pulse sequence may be defined by the pulse width of the top pulse Ton=Tb−Ta, and the pulse width of the off pulse Toff=Tc−Tb.

In the case of write operation using such a pulse sequence, the recording layer of the optical disk 2 is heated by the top pulse to a temperature higher than a melting point, and rapidly cooled in the pulse width Toff of the off pulse. The combination of the top pulse and the off pulse forms a region in the recording layer, the phase of which has been changed from crystal to amorphous, and less laser beam is reflected by the region. The erase pulse following the off pulse allows the recording layer to be cooled and to change to crystal phase thereby to form a region in which more laser beam is reflected. Generally, the amorphous phase region is referred to as a recording mark, and the crystal phase region is referred to as recording space.

The value of multi-level data corresponds to the length of a recording mark in a cell of constant length (the reflective light intensity in read operation that depends on the length of the recording mark). It is noted that the length of a recording mark does not depend on the intensity of write power Pw. Any value of the multi-level data can be written by irradiating laser beam of the same write power Pw for the same pulse period Ton. The length of a recording mark is rather determined only by the length of rapid-cooling period (the pulse width Toff of the off pulse Toff). That is, once the optimal write power and write pulse width (the pulse width Ton of the top pulse) is determined, any value of the multi-value data can be recorded using the single optimal write power.

According to the first embodiment, SER is used as an index indicating how accurate the multi-level data is. SER stands for symbol error rate that is the number of multi-level symbol errors divided by the total number of symbols. Low SER means that the probability of erroneous detection of multi-level data is low, which results in accurate detection of multi-level data in read operation. SER depends on the write power and the write pulse width.

The inventor has intensively studied the reason why SER increases in the case in which multi-level data is written using the write waveform described above with low write power, and has recognized the cause of the problem.

Figure 4:
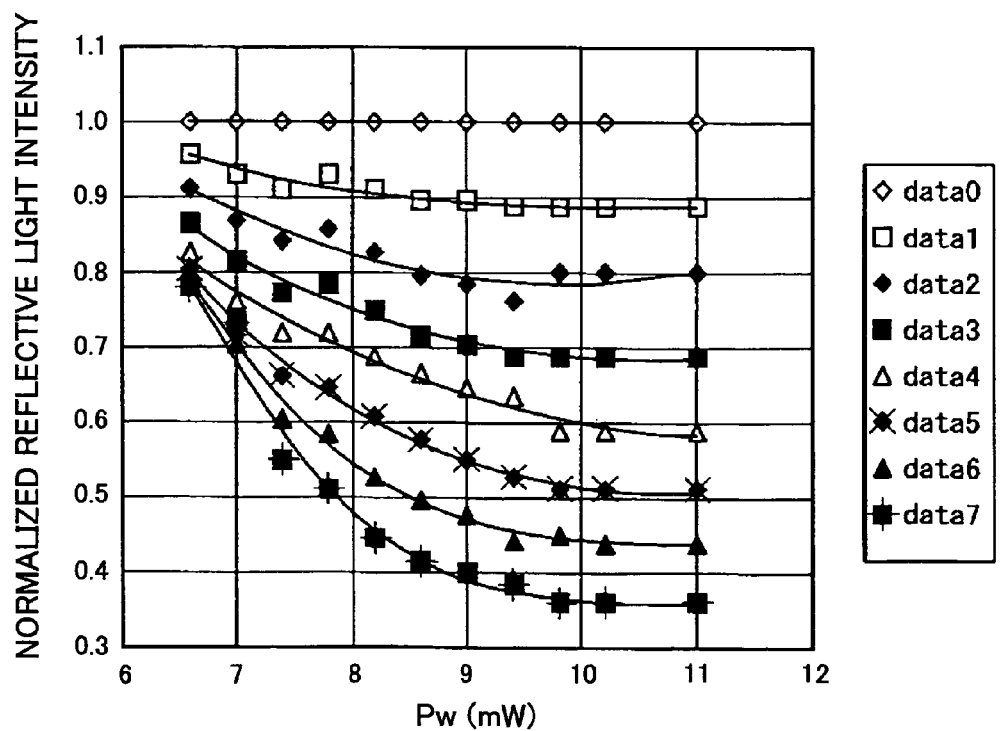
FIG. 4 is a graph showing reflective light intensity corresponding to each write power Pw in the case in which multi-level data is written varying the write power Pw using conventional write waveform.
Figure 5:
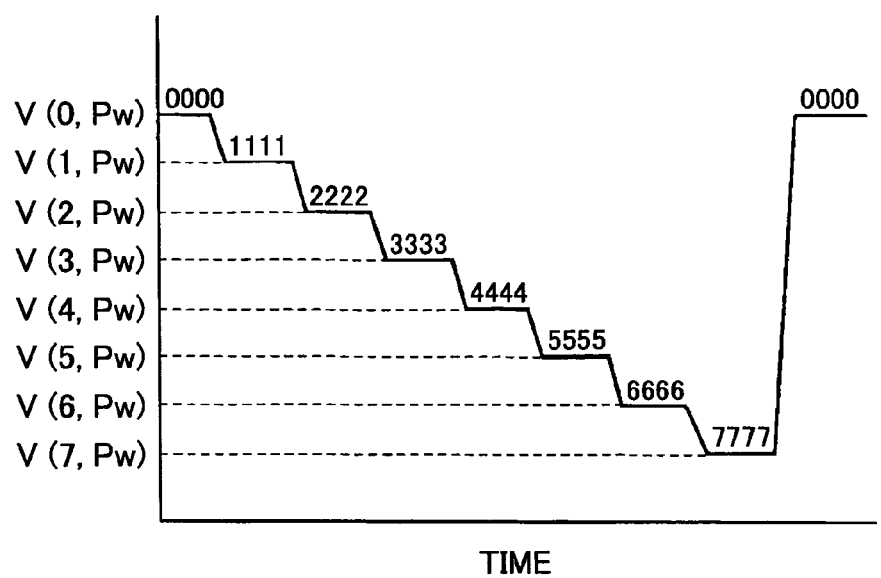
FIG. 5 is a diagram showing exemplary test data used for the analysis of recording properties of multi-level data.

FIG. 4 is a graph showing reflective light intensity corresponding to each value of the multi-level data in the case in which the multi-level data is written using various write power Pw. The numeral following "data" in the legend indicates the value of the written multi-value data. As shown in FIG. 5, test data used for this testing has pattern in which each value is repeated four times.

Figure 27:
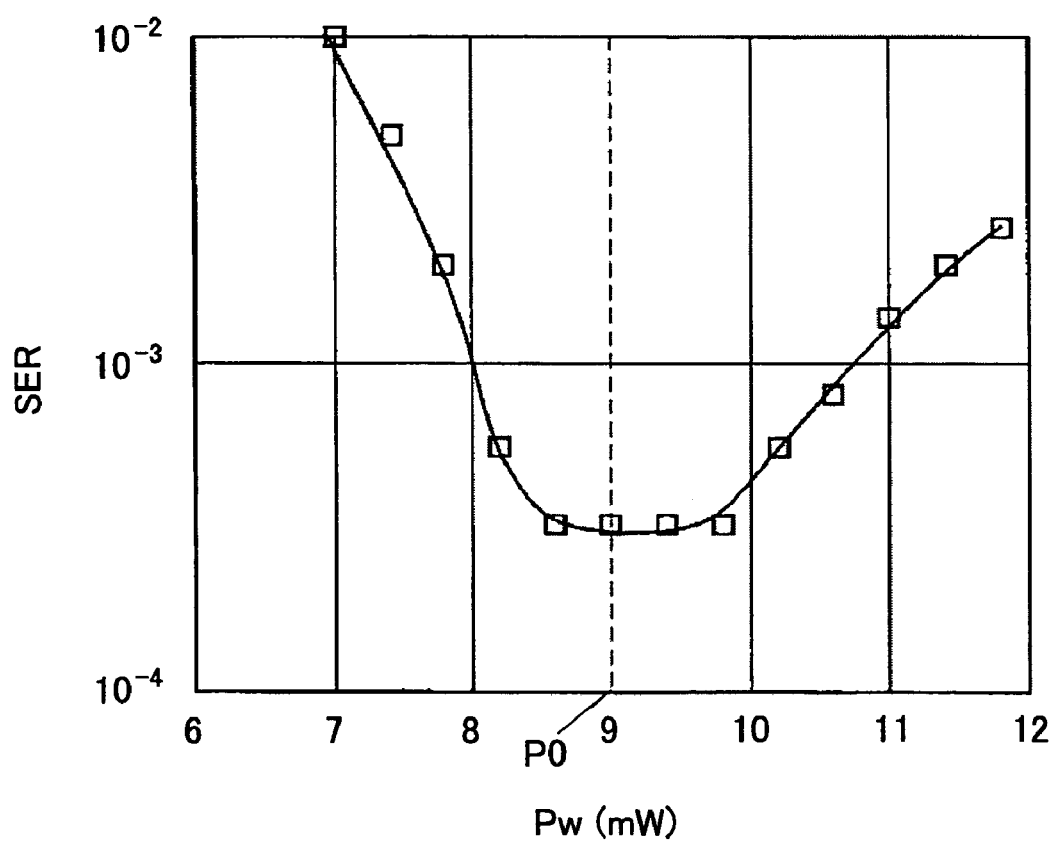
FIG. 27 is a graph showing the relation between the write power Pw and the multi-level data error rate SER in the case in which conventional write waveform is used.

As is apparent from FIG. 4, if the write power is less than the optimal write power (P0=9.0 mW), the reflective light intensity corresponding to multi-value data of 4 or more considerably increases. In the case of write power Pw=7.0 mW, the reflective write intensity corresponding to 5-7 is almost the same. This observation reveals the fact that the difference in the reflective light intensity corresponding to the multi-level data 4-7 for low write powers is too small, even though their recording mark is made long by varying the pulse width Toff of the off pulse based on each value. This results in difficulty in discriminating the values and the increase in SER for low write power as shown in FIG. 27.

According to the inventor's recognition, this problem is caused because if the write power Pw is low, the top pulse cannot heat the recording layer sufficiently, and therefore a recording mark (the amorphous region that reflects less light) cannot be made as large as desired, that is, the reflective light intensity from the recording mark cannot be reduced up to a desired level.

Figure 6:
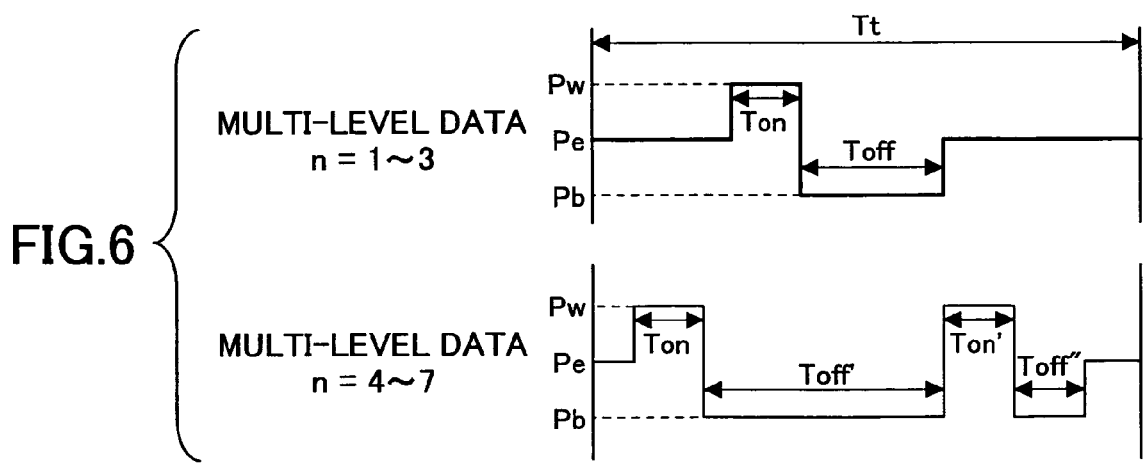
FIG. 6 is a diagram for explaining waveforms used for a method of storing information according to an embodiment of the present invention.

To solve this problem, when multi-value data 4-7 is written, a second top pulse (pulse width Ton') is inserted between the first top pulse (pulse width Ton) and the erase pulse as shown in FIG. 6. However, when multi-value data 1-3 is written, only the first top pulse is used without inserting the second top pulse because, even if the write power is low, the reflective light intensity is different and the data can be discriminated.

The area of a recording mark can be controlled in dependence on the value of the multi-level data by adjusting the pulse width Toff of the off pulse between the first top pulse and the erase pulse in the case of values 1-3, and adjusting the pulse width Toff' of the first off pulse Toff' (see FIG. 6) between the first top pulse and the second top pulse in the case of values 4-7, such that the appropriate reflective light intensity can be obtained depending on the value of the multi-level data. This adjustment allows the appropriate reflective light intensity corresponding to each value to be obtained in read operation.

Figure 7:
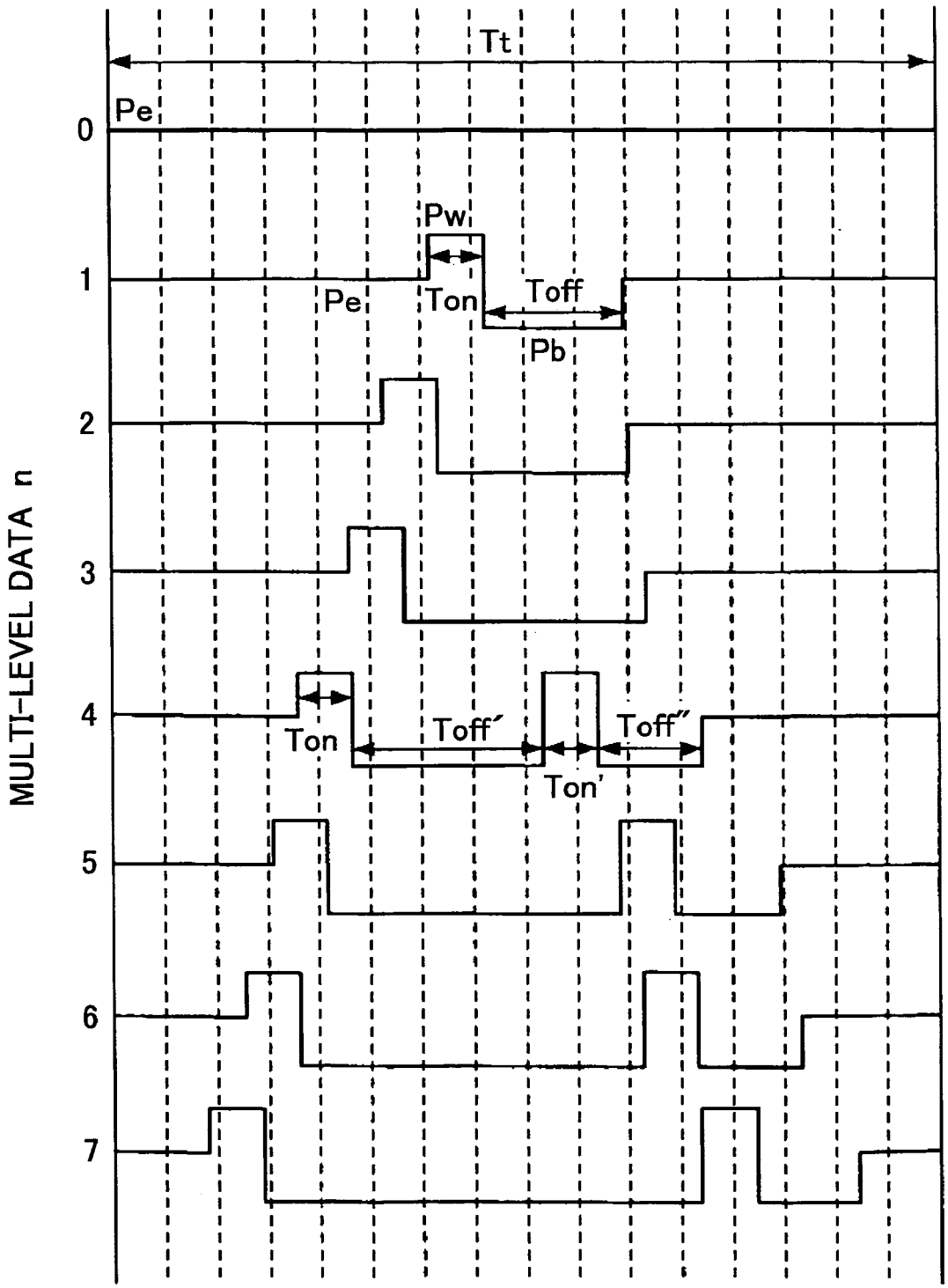
FIG. 7 is a diagram showing exemplary waveforms corresponding to multi-level data 0-7.

Exemplary write waveforms corresponding to values 0-7 of the multi-level data are shown in FIG. 7. The write waveforms for writing values 4-7 have the second off pulse of constant width Toff". Only the width Toff' of the first off pulse is varied.

According to the above arrangements, the problem that, when the write power is low, the recording mark can not be formed due to insufficient heating can be solved. In reading operation, the difference in reflective index between the values is great enough to discriminate the values. As a result, it is possible to prohibit SER from rapidly degrading. Additionally, since the power margin at low write power side can be secured, the multi-level data can be written steadily without being affected by the differences in properties of individual optical disks and optical disk drives and operational environment.

Figure 8:
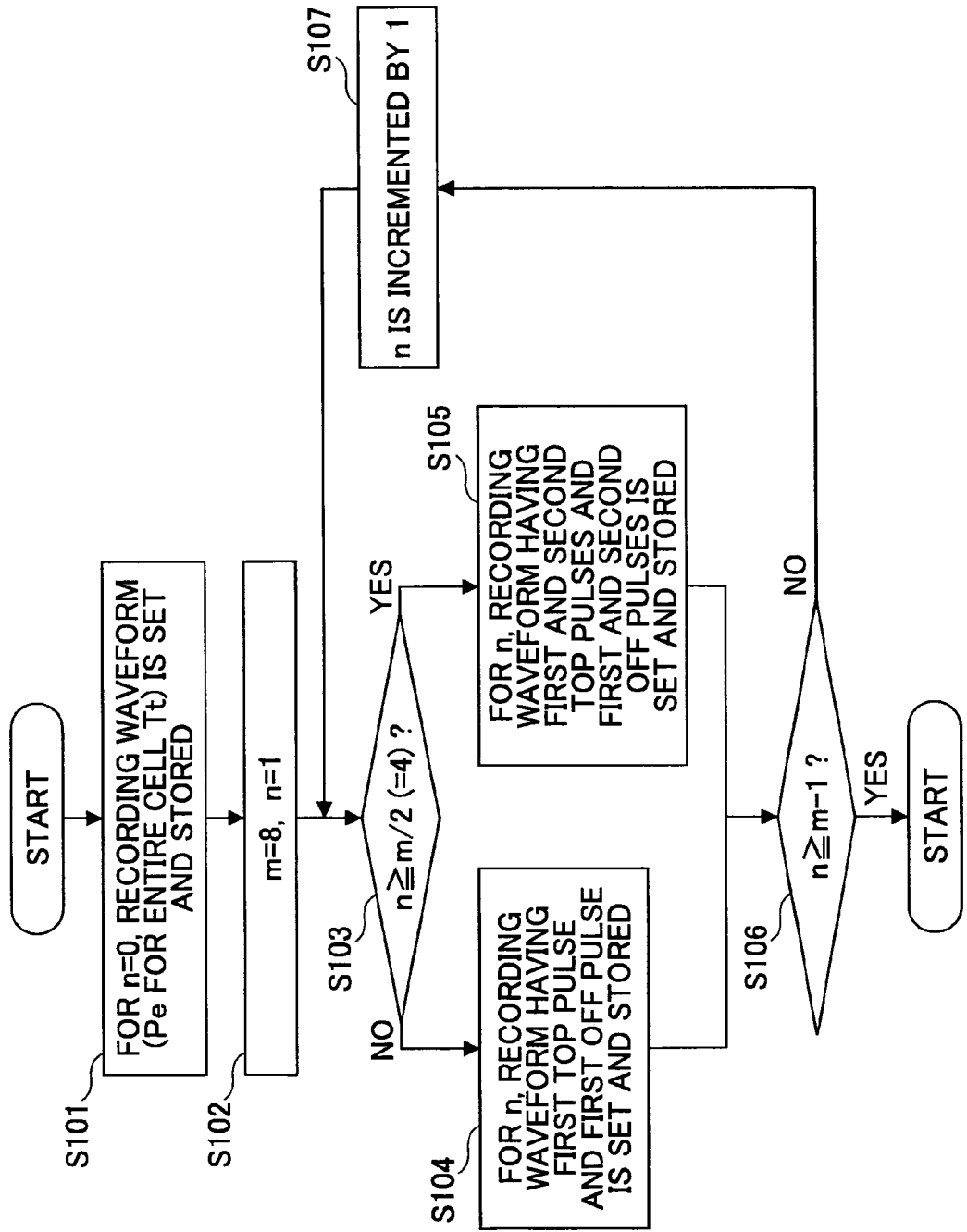
FIG. 8 is a flowchart showing an exemplary process for setting write waveform.

An exemplary process in which a write waveform corresponding to a value of multi-level data is set is shown in FIG. 8. The flowchart shown in FIG. 8 shows an exemplary operation that the controller 11 of the optical disk drive 1 performs following a computer program stored in an internal memory (not shown) at predetermined timing, for example, when the controller 11 is requested to write multi-level data to the optical disk 2.

In step S101, write waveform corresponding to value 0 (counter parameter n=0) is set and stored. The write waveform is a waveform in which the erase power Pe is maintained for the entire cell length Tt. In step S102, the counter parameter m is set at the maximum number of the multi-level data. In this case, m=8 because the maximum number of the multi-level data is assumed to be 8. The counter parameter n indicating the value of the multi-level data is set to 1.

In loop process of steps S103 through S107, the write waveform corresponding to values 1-7 are set and stored.

In step S103, a determination is made whether to insert the second top pulse based on the value n of the multi-level data to be processed. The determination is made based on whether the value n is equal to or more than a threshold m/2 (=4).

If the value n to be processed is less than the threshold m/2 (that is, n=1-3), because the second top pulse is not inserted to the write waveform corresponding to the value n, a waveform having the first top pulse and the first off pulse as well as the erase pulse is set and stored in step S104.

Specifically, the waveform includes the first top pulse having write power Pw and pulse width Ton, and further includes the first off pulse having bias power Pb and pulse width Toff proportional to n, the first off pulse immediately following the first top pulse. The erase power Pe is retained in the remaining period in the cell period Tt (see n=1-3 in FIG. 7).

If a determination is made in step S103 that the value to be processed is less than the threshold m/2 (n=1-3), and that the second top pulse needs to be inserted into the write waveform, a waveform that includes the first top pulse, the first off pulse, the second top pulse, and the second off pulse as well as the erase pulse is set and stored in step S105.

Specifically, there are a first top pulse having the write power Pw and the pulse width Ton, a first off pulse following the first pulse, the first off pulse having bias power Pb and pulse width Toff' proportional to the value n, a second top pulse following the first off pulse, the second top pulse having write power Pw and pulse width Ton', a second off pulse following the second top pulse, the second off pulse having bias power Pb and constant pulse width Toff" in a cell period Tt. The erase power Pe is retained for the remaining cell period (see n=4-7 in FIG. 7).

After the write waveform is set and stored in step S104 or step S105, the process proceeds to step S106 in which a determination is made of whether n is greater than m−1, that is, the setting and storage of the last waveform has been completed. If the setting and storage of the last waveform has not been completed yet, the value n is incremented by 1 in step S107, and the process returns to step S103 from which the setting of the write waveform is repeated. It is noted that the setting of waveforms does not need to be performed in the growing order of the value n. If a determination is made that the setting of the last waveform has been completed, the process is terminated.

According to the above arrangements, waveforms corresponding to respective values of the multi-level data can be set and stored. The waveforms can be used to write multi-level data steadily to an optical disk as described above.

The first embodiment of the present invention is described more specifically based on the result of experiments performed by the inventor. A phase change type optical disk in which multi-level data can be written using laser beam of 405 nm wavelength is used. The aperture of an object lens is NA=0.65. This optical disk is based on a polycarbonate substrate of 120 mm diameter and 0.6 mm thickness. A spiral groove of 0.45 µm pitch is formed on the surface of the substrate by injection forming. A dielectric layer, a phase change recording layer made of Ge—Sb—Te, for example, another dielectric layer, and a reflective layer are formed on the substrate in that order.

Figure 9:
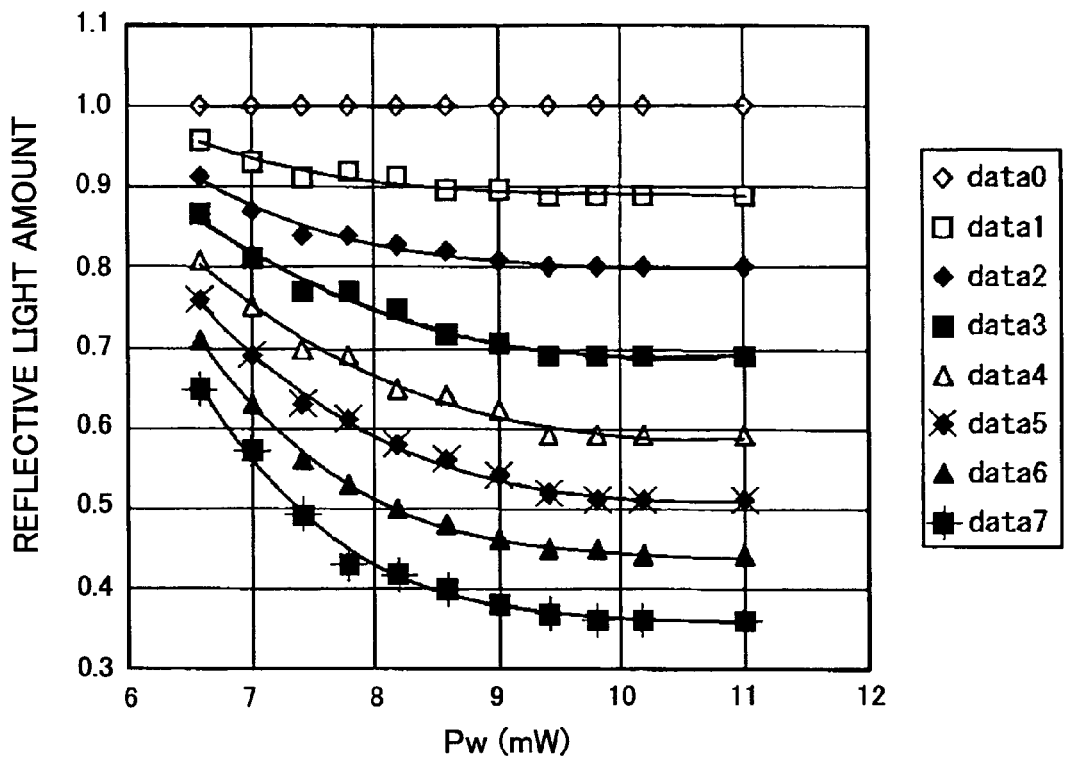
FIG. 9 is a graph, which corresponds to FIG. 4, showing the reflective light intensity corresponding to each write power Pw in the case in which multi-level data is written varying the write power Pw using write waveform according to an embodiment of the present invention.

Multi-level data was written on the above optical disk using the optical disk drive shown in FIGS. 1 and 2, using the waveforms as described with respect to FIG. 7, and using various write power. The graph shown in FIG. 9 shows the result of experiment in which the reflective light intensity from the recording marks corresponding to respective values (n=0-7) of the written multi-level data is measured. The recording cell length was 0.24 µm, the recording linear velocity was 3.5 m/s, and multi-level random data was used.

A comparison of the graph shown in FIG. 9 with the graph shown in FIG. 4 clearly shows that the insertion of the second top pulse for the writing of multi-level data n=4-7 made it possible to sufficiently differentiate the reflective index of the recording marks corresponding to the respective values, and consequently to make the relation between the values of the multi-level data and the reflective light intensity substantially linear.

Figure 10:
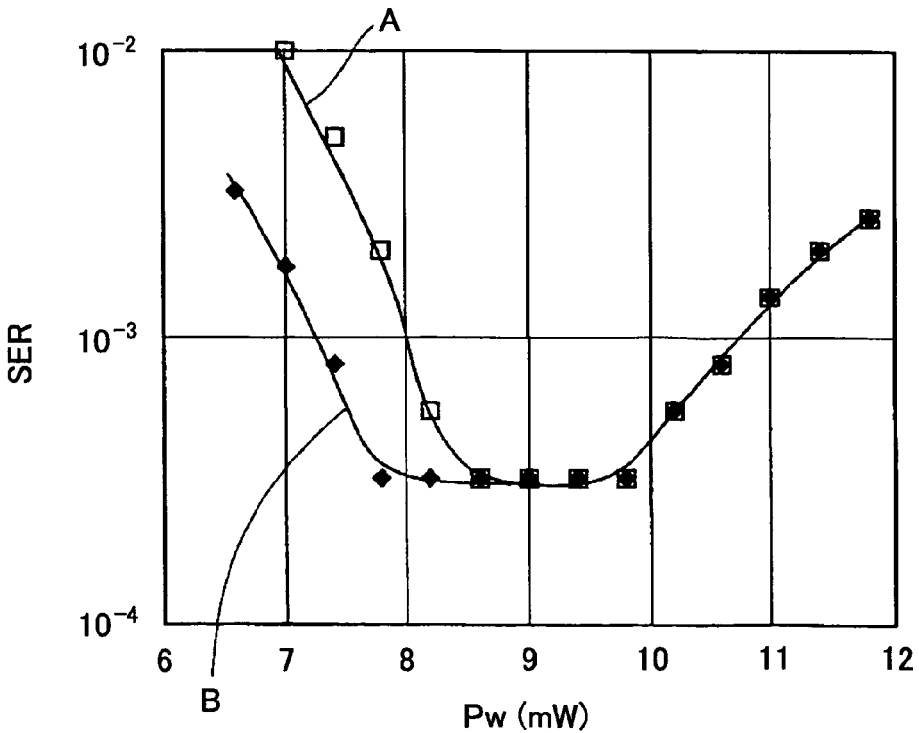
FIG. 10 is a graph showing the relation between the write power Pw and the multi-level data error rate SER comparing the case a information recording method according to the present invention is applied and a conventional method.

FIG. 10 shows the result of an experiment in which the relation between write power Pw and SER was measured for the case in which multi-level data is written using the recording method according to the first embodiment and the case in which multi-level data is written using only the first top pulse. In a graph shown in FIG. 10, curve A indicates the experimental result of a conventional recording method, and curve B indicates the experimental result of a recording method according to the first embodiment.

The graph in FIG. 10 shows that, in the case of the conventional recording method, the range of write power Pw where $SER<10^{-3}$ is Pw=7.8~10.6 mW, but in the case of the recording method according to the first embodiment, the range of write power Pw where $SER<10^{-3}$ is extended to Pw=7.2~10.8 mW. This means that the recording method according to the first embodiment has wider margin at low write power side than the conventional recording method. $SER<10^{-3}$ is a condition which needs to be satisfied to assure practically sufficient condition of bit error rate (BER), $BER<10^{-5}$.

The number of values of the multi-level data is not limited to eight (n=0-7), and may be any number. In that case, the second top pulse may be inserted into the write waveforms of about a half values, the reflective light intensities of which are lower (the area of recording marks is larger) than the reflective light intensities of the other half. According to the first embodiment where the number of values is m=8, assuming the reflective light intensity is high in the order of n=0, 1, . . . , 7, if the value n of the multi-level data is n≧m/2 (that is, n=4-7), the second top pulse is inserted into the waveform for writing the value. Even if the number of values is other than 8, the same threshold, n≧m/2, may be applied. Other threshold, n≧m/3, for example, may be applied in dependence on the specifications of the optical disk and the optical disk drive as described below in further detail.

[Method of Setting Write Waveform: FIGS. 11-18]

The method of setting a write waveform explained with respect to the first embodiment is described in further detail below.

When the second top pulse is inserted into the write waveform, two off pulses are formed in the write waveform as shown in FIG. 6.

The inventor examined the dependency of the reflective light intensity from a recording mark on the pulse width Toff' of the first off pulse and the dependency of the reflective light intensity on the pulse width Toff" of the second off pulse.

Figure 11:
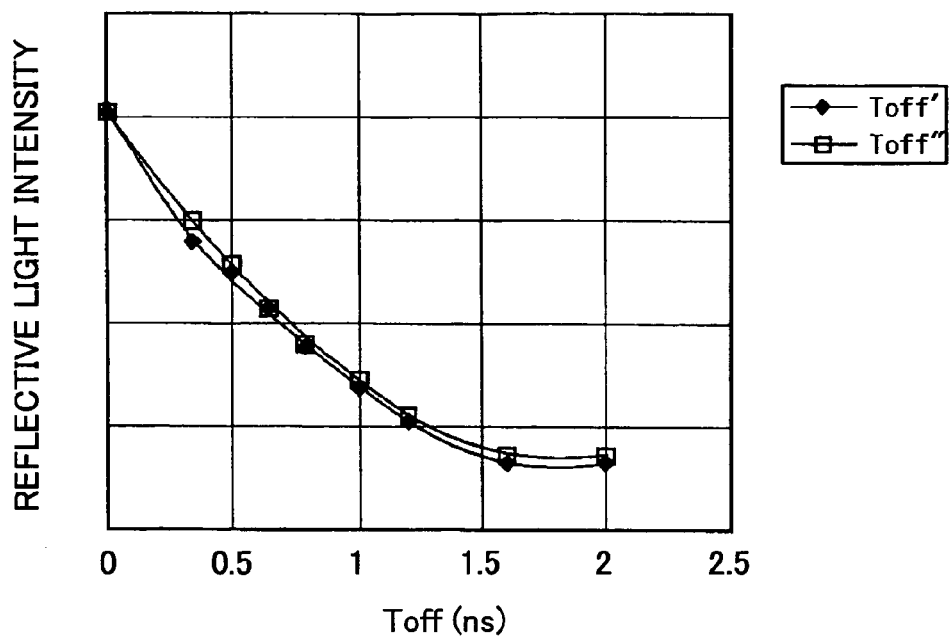
FIG. 11 is a graph showing the dependency of the reflective light intensity from a recording mark on the pulse width Toff' of the first off pulse and the pulse width Toff" of the second off pulse.

FIG. 11 shows the result of the above experiment. In FIG. 11, black diamonds indicate the dependency of the reflective light intensity on the pulse width Toff', and white squares indicate the dependency of the reflective light intensity on the pulse width Toff". This experiment is performed under the following conditions: the recording cell length being 0.24 µm, the recording linear velocity being 6.0 m/s, the pulse width Ton of the first top pulse being 5.0 ns, the pulse width Ton' of the second top pulse being 4.0 ns. When the pulse width Toff' of the first off pulse is varied, the pulse width Toff" of the second off pulse is made constant at 5.0 ns. When the pulse width Toff" of the second off pulse is varied, the pulse width Toff' of the first off pulse is made constant at 5.0 ns.

The graph shown in FIG. 11 indicates that both Toff' and Toff" can be equally used to control the reflective light intensity. Accordingly, because the reflective light intensity can be controlled by Toff', Toff", or both, a determination of which to use may be made in accordance with the properties of material of which the recording medium is made.

Figure 12:
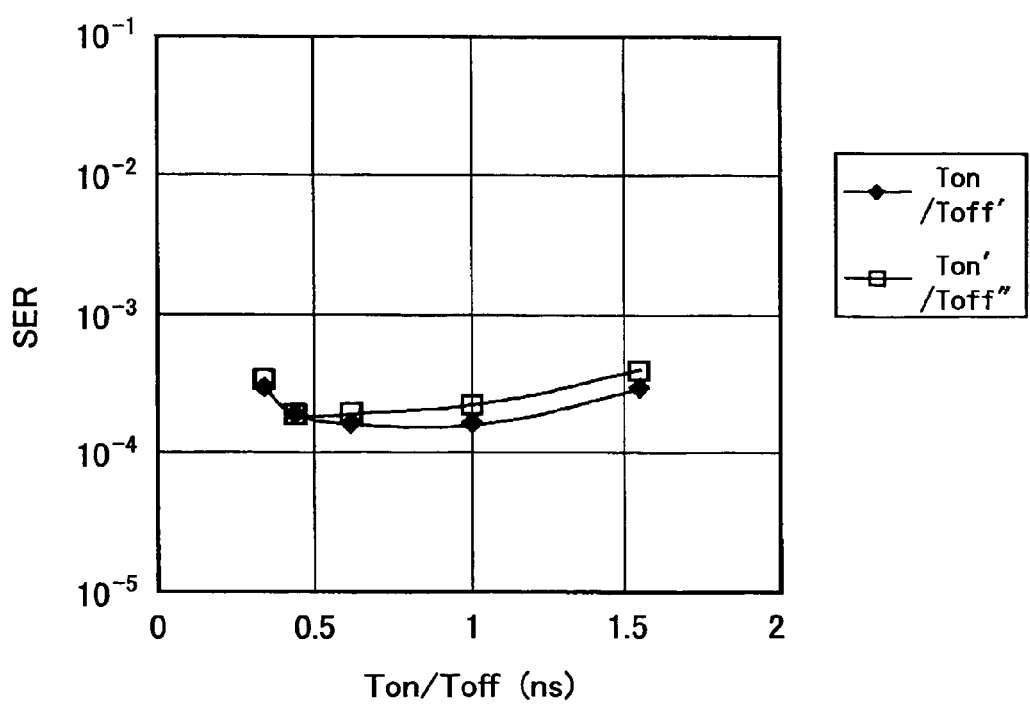
FIG. 12 is a graph showing the dependency of SER on Ton/Toff in the case of the reflective light intensity being adjusted by Toff' and Toff"

For example, SER was obtained in the case in which the reflective light intensity of an optical disk made of the recording material explained with respect to the first embodiment was controlled by Toff' and in the case in which the reflective light intensity of the optical disk was controlled by Toff". FIG. 12 shows the SER of each case. The graph in FIG. 12 shows that the SER obtained in the case in which the reflective light intensity is controlled by Toff' is better than the SER obtained in the case in which the reflective light intensity is controlled by Toff". As a result, in such a case, it is preferable to use Toff' to control the reflective light intensity.

Toff' may be adjusted such that, when the multi-level data is written, the reflective light intensities corresponding to respective values of the multi-level data are proportional (has linear relation) to the values.

Figure 13:
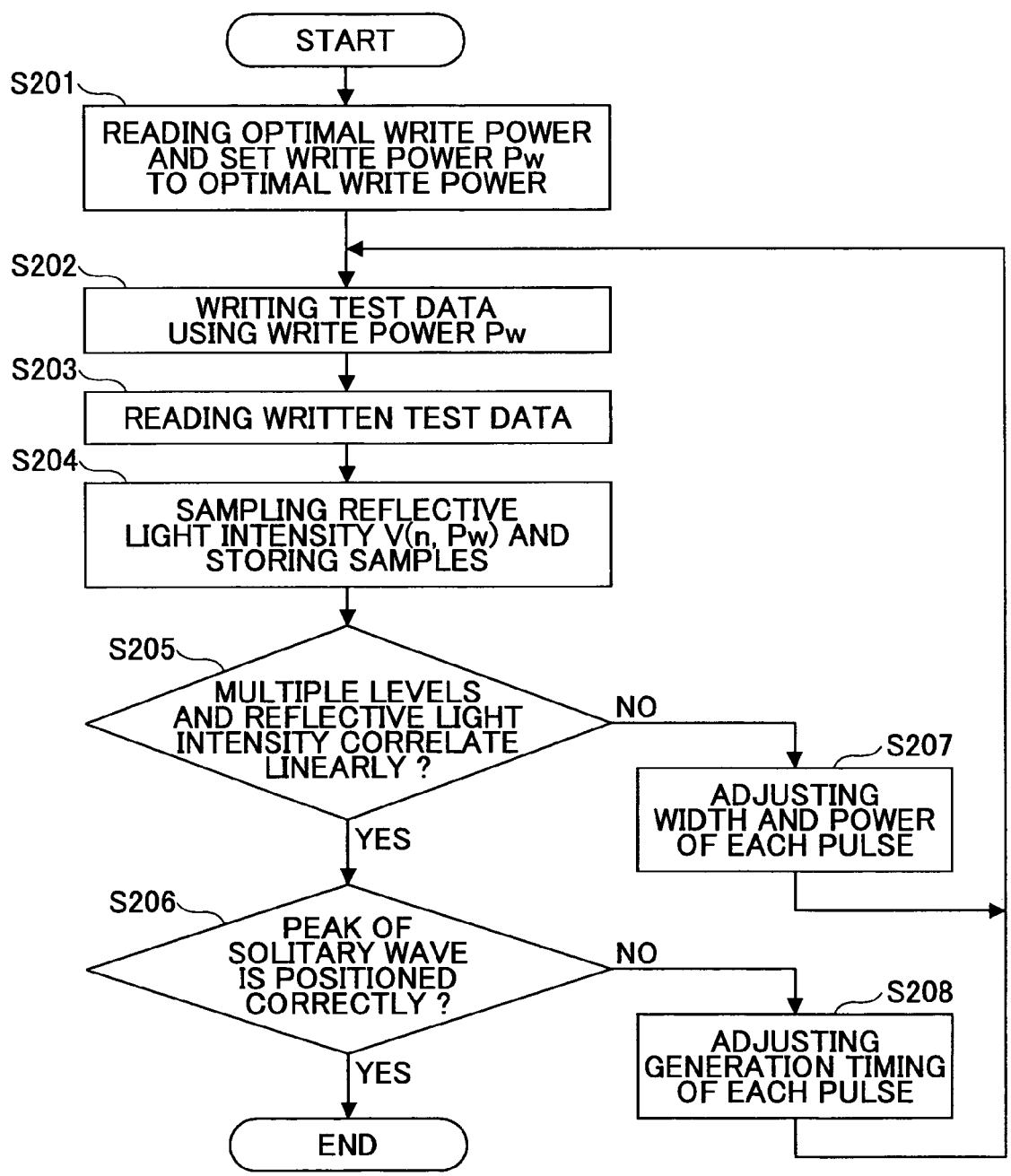
FIG. 13 is a flowchart showing exemplary adjustment of write waveform such that the reflective light intensity of a written recording mark corresponding to each multi-level data value has linear relation with each other.

FIG. 13 is a flowchart showing an exemplary process in which a write waveform is adjusted such that the reflective light intensity of a recording mark formed corresponding to each value of the multi-level data has linear relation with the values. An exemplary process in which timing at which each pulse of the write waveform is generated such that a recording mark can be formed at an appropriate sampling position is also shown in this flowchart. The controller 11 of the optical disk drive 1 performs processing shown in the flowchart by executing a computer program stored in an internal memory (not shown) at necessary timing in which, for example, the controller 11 completes the setting of the write waveform in accordance with the flowchart shown in FIG. 8.

In step S201, information about the optimal write power is retrieved, and is used as write power Pw. The information of the optimal write power may be written in advance in a region of the optical disk by wobble, pits, or marks, or may be stored in a memory unit of the optical disk drive.

In step S202, this write power Pw is used to write test data. The test data may include a pattern shown in FIG. 5 in which each value of the multi-level data is repeated four times, or a pattern shown in FIG. 14 in which the reflective light intensity corresponding to each value of the multi-level data can be reproduced as a solitary wave without interference. The write waveform set in the process shown in the flowchart of FIG. 8 and the write waveform information of which is stored in advance in the optical disk drive 1 or the optical disk 2 can be used in this step. If the second top pulse needs to be inserted in the write waveform, the same write power Pw is used for the first top pulse and the second top pulse.

In step S203, the written test data is reproduced. In step S204, the reflective light intensity V(nnn, Pw) corresponding to each value n is sampled and stored. If there are three n's on the left side in the parentheses of V(nnn, Pw), V(nnn, Pw) means the reflective light intensity in the case in which the second n among a multi-level data sequence n, n, n, which has been written using the write power Pw, is reproduced.

In step S205, if the test data having the pattern shown in FIG. 5 is sampled, a determination is made of whether the reflective light intensities V(000, Pw) through V(777, Pw) has an appropriate linear relation or not. The determination is described below in more detail.

Figure 14:
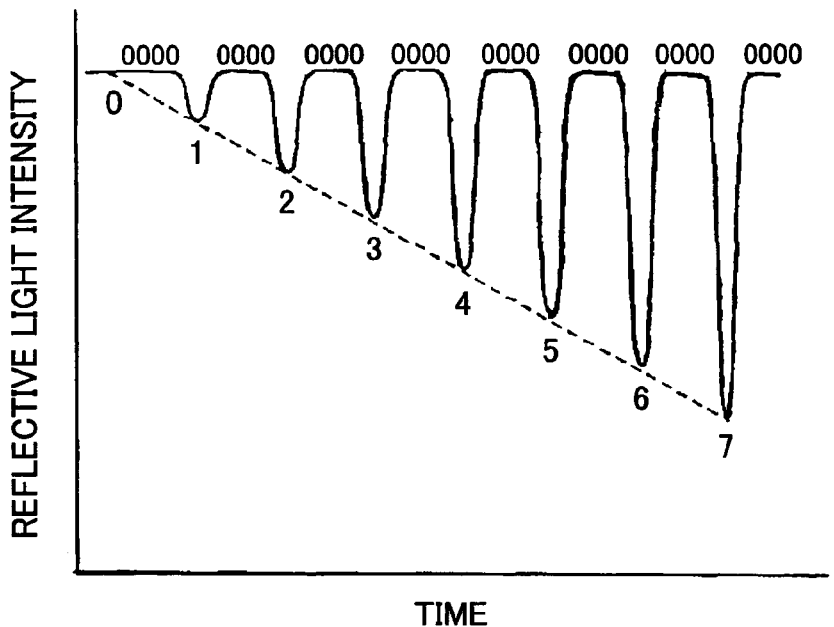
FIG. 14 is a schematic diagram showing exemplary test data showing solitary wave pattern.
Figure 15:
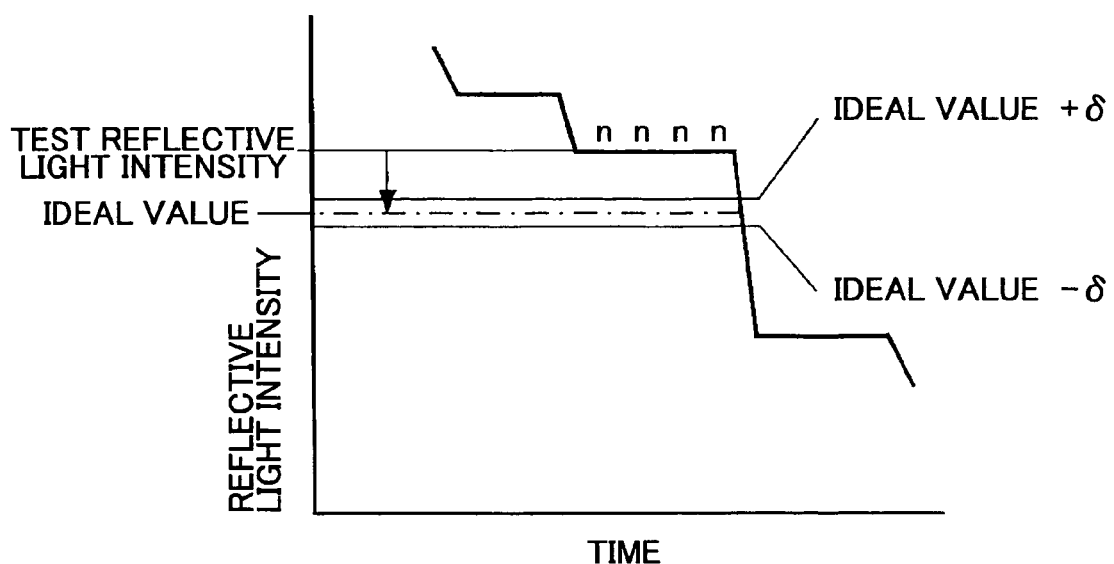
FIG. 15 is a schematic diagram for explaining the adjustment of reflective light intensity in the process shown in FIG. 13.

If a determination is made that the reflective light intensities V(nnn, Pw) have an appropriate linear relation, the process proceeds to step S206 in which a determination is made of whether, in the case in which test data having the pattern as shown in FIG. 14 is sampled, the peak of each solitary wave is positioned correctly. The determination is described below in more detail. If a determination is made that the peak of each solitary wave is positioned correctly, the process is terminated.

If a determination is made that the reflective light intensities V(nnn, Pw) do not have an appropriate linear relation, the process proceeds to step S207 in which the width and power of each pulse included in the write waveform are adjusted (to be described below). Then, the process returns to step S202 in which the writing of test data and a determination of linearity are repeated using the new write waveform. If a determination is made that the peak of each solitary wave is not positioned correctly in step S206, the process proceeds to step S208 in which the timing in which each pulse of the write waveform is generated is adjusted. Then, the process returns to step S202 in which the new write waveform is used to write test data, and following steps are repeated.

According to the above arrangements, the width and the power of each pulse included in the write waveform can be adjusted such that the reflective light intensity corresponding to each value of the multi-level data has linear relation with each other, and the timing in which each pulse is generated can be adjusted such that the recording mark is formed at a correct position.

The determination of whether the reflective light intensity V(nnn, Pw) of each value has linear relation with each other in step S205 and the adjustment of the width and the power of each pulse included in the write waveform are described in detail below. The determination of whether the reflective light intensity V(nnn, Pw) of each value has linear relation with each other in step S205 is made by reproducing the test data having the repetition pattern as shown in FIG. 5 and checking whether the reflective light intensity V(nnn, Pw) corresponding to each value n of the multi-level data satisfies the following relation (1).

$$\left| V(nnn, Pw) - \left[ V(000, Pw) - n \times \frac{V(000, Pw) - V(777, Pw)}{7} \right] \right| \leq \delta \quad (1)$$

The relation (1) is satisfied if V(nnn, Pw) is within a range of error $\delta$ from the ideal value obtained by equally dividing the distance between V(000, Pw) and V(777, Pw). The value $\delta$ is the tolerable error of each reflective light intensity for assuring that the reflective light intensity corresponding to each value of the multi-level data is equally distant from each other. In the first embodiment, the value $\delta$ is determined based on 5% of the distance between the reflective light intensities corresponding to the ideal value and its adjacent value. Specifically, $\delta$ is determined by the following equation (2).

$$\delta = \frac{\{V(000, Pw) - n \times V(777, Pw)\}/7}{20} \quad (2)$$

Because the relation (1) is of course satisfied by n=0 and n=7, if the relation (1) is satisfied by n=1 through 6, a determination is made that the reflective light intensity has linear relation with each other. In the case in which at least one of n=1~6 does not satisfy the relation (1), either relation (3) or (4) is satisfied.

$$V(nnn, Pw) - \left\{ V(000, Pw) - n \times \frac{V(000, Pw) - V(777, Pw)}{7} \right\} > \delta \quad (3)$$

or $$V(nnn, Pw) - \left\{ V(000, Pw) - n \times \frac{V(000, Pw) - V(777, Pw)}{7} \right\} < \delta \quad (4)$$

If the above relation (3) is satisfied, the reflective light intensity V(nnn,Pw) corresponding to the value n is higher than the ideal reflective light intensity V(000,Pw)−n×{V(000, Pw)−V(777,Pw)}/7 by the tolerable error δ or more. As a result, adjustment can be made such that the reflective light intensity V(nnn, Pw) is lowered toward the ideal reflective light intensity V(000,Pw)−n×{V(000,Pw)−V(777,Pw)}/7 and the error becomes less than the tolerable error δ.

An example of a method of lowering the reflective light intensity includes the extension of the first off pulse, the second off pulse, or both as described with reference to FIG. 11. In this case, if the relation between the pulse width of the off pulse and the reflective light intensity is examined in advance and the adjustment of the pulse width is determined based on the examination, the number of trials can be reduced and the adjustment of the pulse width can be made efficient.

If the above relation (4) is satisfied, the reflective light intensity V(nnn,Pw) is lower than the ideal reflective light intensity by the tolerable error δ or more to the contrary. Consequently, adjustment is made such that the reflective light intensity V(nnn,Pw) is increased toward the ideal reflective light intensity and the error becomes less than the tolerable error δ.

This adjustment can be made by reducing the pulse width of the first off pulse, the second off pulse, or both.

The adjustment in step S207 is repeated until the condition of step S205 is satisfied so as to set a write waveform that results in substantially equal distance of the reflective light intensities and linearity.

The adjustment for assuring the linearity of the reflective light intensities can be made not only by adjusting the pulse width of the off pulse as described above, but also by adjusting the pulse width Ton or Ton' of the first top pulse and the second top pulse, respectively, or the write power Pw1 or Pw2 of the first top pulse and the second top pulse, respectively. For example, in the case in which the reflective light intensity V(nnn,Pw) is higher than the ideal reflective light intensity and the above relation (3) is satisfied, the pulse width Ton of the first top pulse, the pulse width Ton' of the second top pulse, or both can be increased. Alternatively or additionally, the write power Pw1 of the first top pulse, the write power Pw2 of the second top pulse, or both may be increased. In the case in which the reflective light intensity V(nnn,Pw) is lower than the ideal reflective light intensity, and the above relation (4) is satisfied, adjustment opposite the above may be performed in step S207.

How the SER is affected by the increase of the pulse width Ton of the first top pulse and the pulse width Ton' of the second top pulse is described below.

Figure 16:
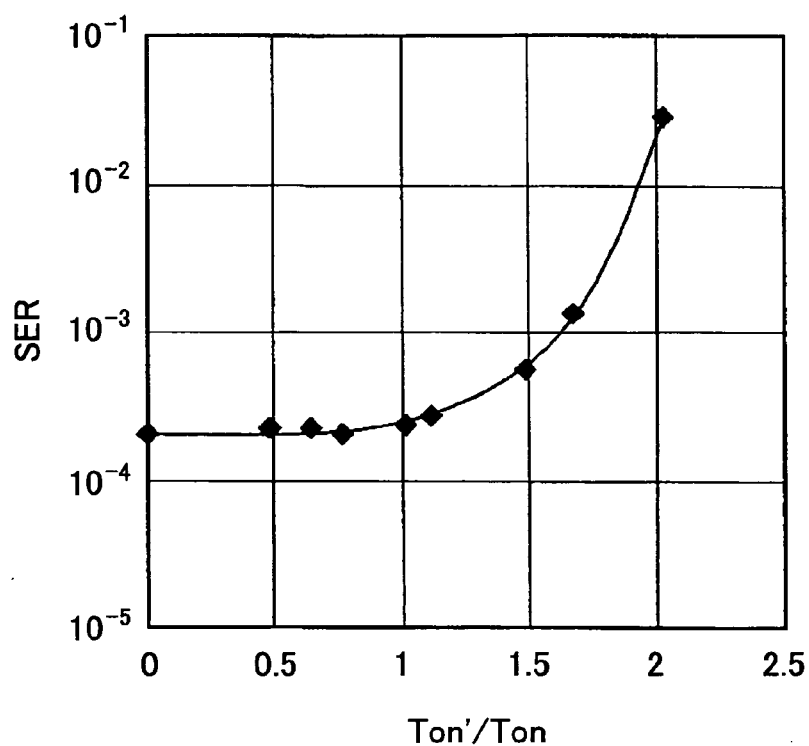
FIG. 16 is a graph showing how the multi-level data error rate SER changes as the ratio Ton'/Ton of the pulse width of the second top pulse and the pulse width of the first top pulse is varied.

FIG. 16 is a graph showing how SER changes as Ton'/Ton is varied. Both the write power Pw1 of the first top pulse and the write power Pw2 of the second top pulse were 9.0 mW. The pulse width of the off pulse is used to adjust the reflective light intensity.

FIG. 16 clearly shows that, if Ton'/Ton>1.0, that is, the pulse width Ton' of the second top pulse is longer than the pulse width Ton of the first top pulse, SER increases. If Ton'/Ton is too high, the multi-level data can not be recorded accurately. The cause of this increase in SER is considered to be the increase of thermal interference to adjacent recording cell.

On the other hand, as long as the pulse width Ton' of the second top pulse is shorter than the pulse width Ton of the first top pulse, no increase in the SER is observed. However, if Ton'/Ton<0.5, that is, the pulse width Ton' of the second top pulse becomes less than a half of the pulse width Ton of the first top pulse, the effect of inserting the second top pulse is reduced, that is, the power margin is reduced. According to the above observation, if the pulse width Ton of the first top pulse and the pulse width Ton' of the second top pulse are adjusted, it is preferred to change Ton and Ton' under the condition 0.5≦Ton'/Ton≦1.0.

The effect to SER of the change in the write power Pw1 of the first top pulse and the write power Pw2 of the second top pulse is described below.

Figure 17:
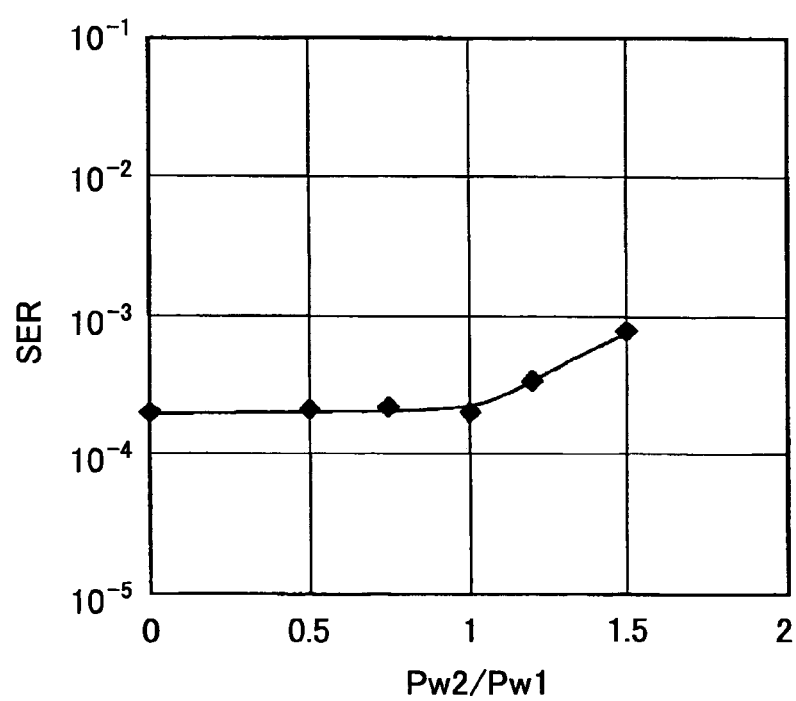
FIG. 17 is a graph showing how the multi-level data error rate SER changes as the ratio Pw2/Pw1 of the write power of the second top pulse and the write power of the first top pulse is varied.

FIG. 17 is a graph showing the result of an experiment in which how SER changed as Pw2/Pw1 was varied. The reflective light intensity was adjusted by the pulse width of the off pulse.

This graph shows that, if Pw2/Pw1>1.0, that is, the write power Pw2 of the second top pulse is greater than the write power Pw1 of the first top pulse, SER increases. This increase in SER is considered to be the result of the increase of thermal interference to adjacent recording cells due to large Pw2.

On the other hand, if the write power Pw2 of the second top pulse is lower than the write power Pw1 of the first top pulse, a little increase in SER was observed. However, if Pw2/Pw1<0.5, that is, the write power Pw2 of the second top pulse becomes lower than a half of the write power Pw1 of the first top pulse, the preferable effect caused by the insertion of the second top pulse becomes small, that is, the increase in power margin is reduced. As a result, in the case in which the write power Pw1 of the first top pulse and the write power Pw2 of the second top pulse are adjusted, the write powers are adjusted such that 0.5≦Pw2/Pw1≦1.0.

The determination of the peak position of a solitary wave in step S206 of FIG. 13 and the adjustment of timing in which each pulse of the write waveform is generated in step S208 of FIG. 13 are described below in detail.

As described above, the diameter of a light spot used for reproduction process is greater than the length of a recording cell. In the case in which zero is written (no recording mark is formed) in recording cells preceding and following a recording cell in which a certain value (not zero) is written, the reflective light intensity from the preceding and following cells may be reduced due to the existence of the cell in which the certain value (not zero) is written. As a result, when the multi-level data written in these recording cells is reproduced, a solitary wave is generated over the recording cells, the center position of which corresponds to the center position of a recording mark 53 formed in a recording cell 56 in the middle.

However, when an optical disk drive reproduces a signal recorded in an optical disk, the reflective light intensity from the optical disk is sampled in synchronization with the center position of a recording cell. If the peak position of the above solitary wave is shifted from the center position of the recording cell 56 in the middle due to the diversity of optical disks and environmental change, the true intensity of reflective light corresponding to the value written in the recording mark may not be obtained. To solve this problem, the shift of the peak position of a solitary wave is detected in step S206 of FIG. 13, and the write waveform is adjusted to compensate for the shift in step S208 of FIG. 13.

Figure 18:
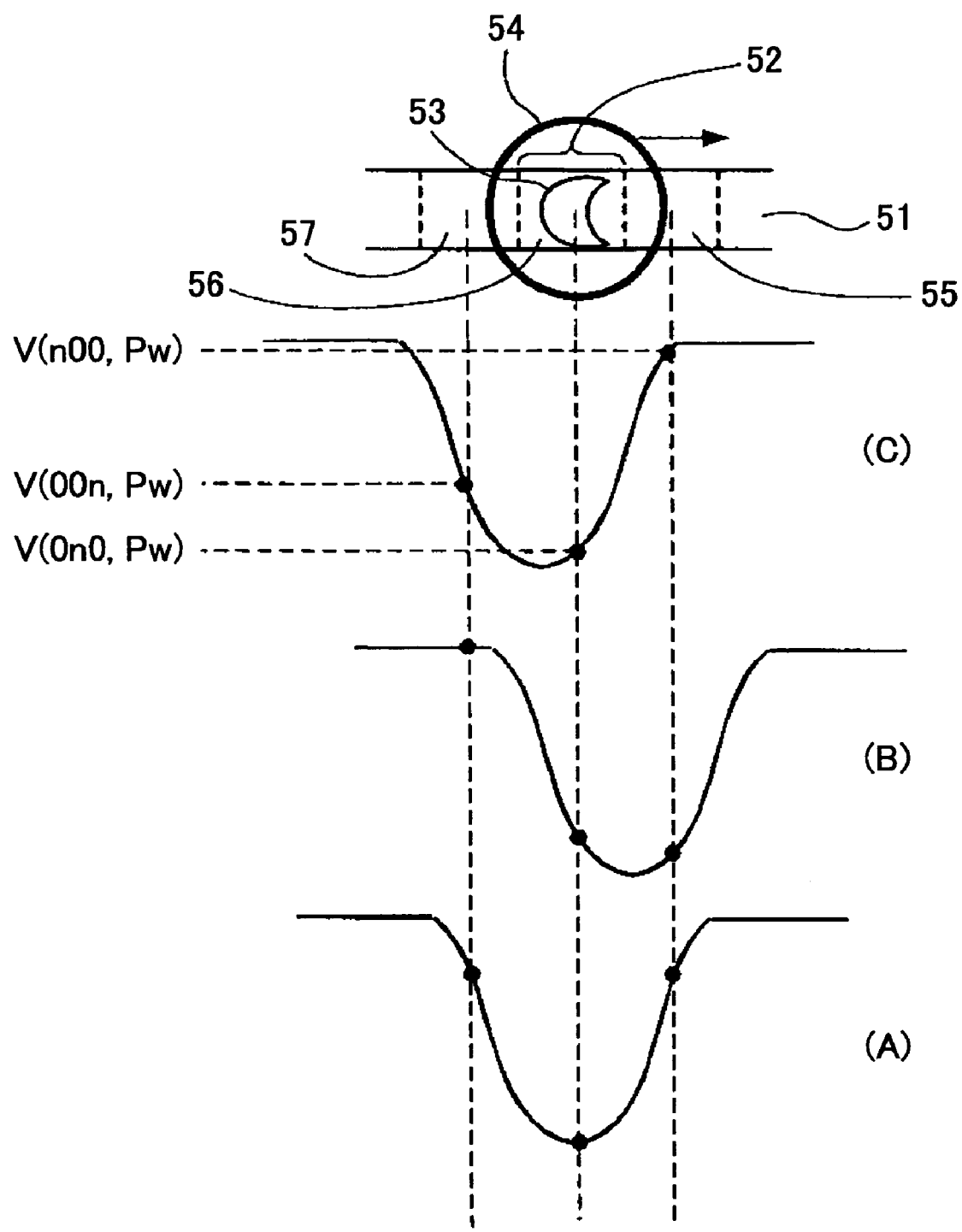
FIG. 18 is a schematic diagram for explaining the determination of peak position of a solitary wave in the process shown in FIG. 13.

The shift of the peak position of a solitary wave is detected by comparing the reflective light intensity corresponding to the preceding recording cell 55 and the reflective light intensity corresponding to the following recording cell 57 as shown in FIG. 18.

If the recording mark written in the middle recording cell 56 is not shifted, the reflective light intensity indicated as (A) is detected. The reflective light intensities V(n00,Pw) and V(00n,Pw) detected from the preceding and following recording cells 55, 57 are little different. However, if the position of the recording mark written in the middle recording cell 56 is shifted, the reflective light intensities are also shifted as indicated as (C) and (B) in FIG. 18, the difference between V(n00,Pw) and V(00n,Pw) becomes great.

Therefore, the shift of the peak position is detected based on whether V(n00,Pw) and V(00n,Pw) satisfy the following condition (5) or not.

$$|V(00n,Pw)-V(n00,Pw)| \leq \delta \quad (5)$$

where δ is a tolerable error which may be the same as the tolerable error obtained by the equation (2) described above.

If the condition (5) is satisfied for all values n of multi-level data, a determination is made that the peak position of a solitary wave substantially corresponds to the center position of the middle recording cell 56. If the condition (5) is not satisfied for at least one of the values of multi-level data, a determination is made that the peak position of a solitary wave is shifted from the center position of the middle recording cell 56. In this case, either the following conditions (6) or (7) is satisfied.

$$V(00n,Pw)-V(n00,Pw) < -\delta \quad (6)$$

$$V(00n,Pw)-V(n00,Pw) > \delta \quad (7)$$

If the above condition (6) is satisfied in the case in which the reflective light intensity detected from the recording cell 55 is greater than the reflective light intensity detected from the recording cell 57 by δ or more. In this case, the peak position of a solitary wave is shifted in the direction the move of the light spot. As a result, adjustment is made such that the timing of the rise or fall of each pulse in the write waveform is delayed in step S208, that is, the rise and fall of each top pulse and the rise of the erase pulse are delayed.

The above condition (7) is satisfied in the case in which the reflective light intensity detected from the recording cell 57 is greater than the reflective light intensity detected from the recording cell 55 by δ or more as indicated as (B) in FIG. 18. In this case, the peak position of a solitary wave is shifted in the opposite direction to the move of the light spot. As a result, adjustment is made such that the timing of the rise or fall of each pulse in the write waveform is hastened in step S208, that is, the rise and fall of each top pulse and the rise of the erase pulse are hastened.

Thus, the adjustment of step S208 is repeated until the condition of step S206 is satisfied thereby to adjust the timing in which each pulse of the write waveform is generated is adjusted such that the peak position of each solitary wave comes to the center position of the middle recording cell 56.

[Method of Setting Top Pulse Width (1)]

The reflective light intensity corresponding to written multi-level data can be adjusted not only by adjusting the pulse width or the write power of the off pulse as described above but also by adjusting the pulse width of the first top pulse, the second top pulse, or both in the write waveform. The pulse width of the first top pulse, the second top pulse, or both in the write waveform can be adjusted such that, even in the case of low write power recording, the reflective light intensity is linearly related to the values of multi-level data. According to the above arrangements, the multi-level data recording can be further improved. The adjustment is described below in further detail.

Described below is a method of setting the pulse width of the top pulse such that the reflective light intensity is linearly related to the value of multi-level data even in low write power recording thereby to improve SER at low write power side and increase the power margin. First, write power P0 is retrieved from a lookup table stored in the optical disk or in a memory unit of the optical disk drive. Then, the test data shown in FIG. 5 is written using the write power P0 and write power PLO that is lower than the write power P0. The reflective light power corresponding to each value n of multi-level data is measured for each write power. P0 is the write power that is used for the writing of multi-level data (actual data after test recording), and usually is the optimal write power that is predetermined or derived. PLO can be set at PLO=0.85P0, but is not limited to this value.

The following equation (8) defines Δ(n,PLO):

$$\Delta(n, P_{LO}) = \Delta(n, P_{LO}) - \left\{ V(0, P0) + n \times \frac{V(m-1, P0) - V(0, P0)}{m-1} \right\} \quad (8)$$

where m being the number of values of multi-level data to be written (8 in this case) and V(n,Pw) being the reflective light intensity of multi-level data value n that is detected in the case in which the test data is written using the write power Pw and read.

In the above equation (8), the second term on the right is the value of reflective factor corresponding to multi-data value n to be obtained using the reflective factors of multi-level data value 0 (maximum reflective factor) and multi-level data value m−1 (minimum reflective factor) based on test recording using the write power P0 under the assumption that the multi-level data values and corresponding reflective factors have linear relation. Thus, Δ(n,PLO) is the difference between the reflective light intensity of multi-level data value n that is detected by test recording using the write power PLO and the ideal reflective light intensity (target value).

If the following condition (9) is not satisfied for a certain multi-level data value n, $$|\Delta(n, P_{LO})| \leq \frac{V(m-1, P0) - V(0, P0)}{2(m-1)} \quad (9)$$

the write waveform used for the writing of multi-level data value n is adjusted such that by extending the pulse width of the first top pulse, the pulse width of the second top pulse, or both. Then the test recording and reproduction are repeated using the write waveform after the adjustment. In the above condition (9), |Δ(n,PLO)| means the absolute value of Δ(n, PLO). According to the above arrangements, the recording mark can be written even using low write power, and the reflection factor can be made close to a reflection factor corresponding to the optimal write power. The adjustment may be performed for each multi-level data value independently.

The above procedure is repeated until the above condition (9) is satisfied by Δ(n,PLO) of all multi-level data values n. The insertion of the equation (8) to the condition (9) leads to the following condition (10) that is to be satisfied by V(n, PLO).

$$\Delta(n, P_{LO}) \leq V(0, P0) + (2n-1) \times \frac{V(m-1, P0) - V(0, P0)}{2(m-1)} \quad (10)$$

Therefore, it is understood that the pulse width may be adjusted such that the reflective light intensity obtained by test writing and reproduction satisfies the above condition (10).

The above condition (10) sets a upper limitation to V(n, PLO). According to the present embodiment, a determination of whether V(n,PLO) satisfies a condition setting a lower limitation of V(n,PLO) is not made because the write power PLO is lower than the write power P0, and consequently the case in which a too large recording mark is formed and the reflective light intensity becomes too low is scarce.

As described above, if the write waveform in which the pulse width of the top pulses is optimally adjusted is used, the relation between multi-level data values and corresponding reflective light intensities remains linear even in the case in which recording is performed using write power lower than the optimal light power, and the case in which recording is performed using de-focused laser beam due to the bend of the optical disk. If the reflective light intensities corresponding to respective multi-level data values become crammed, SER can be reduced by re-setting the above threshold.

It is not requisite to store the write power P0 in the lookup table. The write power P0 may be measured or derived using an appropriate technique for each recording.

[Method of Setting Top Pulse Width (2)]

Described below is a method of improving SER properties at low power side thereby to extend the power margin by setting the pulse width of the top pulses such that change in the reflective light intensity corresponding to each multi-level data value written with low write power falls in a range set using the optimal write power. The definition of variables and parameters used in the following description is the same as that of the above method of setting top pulse width (1).

The following threshold of the reflective light intensity corresponding to multi-level data value is used for the reproduction of written multi-level data. V(n,P0) is defined as the reflective light intensity corresponding to multi-level data value n (n=0, 1, 2, . . . , m−1) written with the optimal write power P0. If the reflective light intensity V obtained by reproducing a certain multi-level data falls in the range indicated by the following condition (11), a determination can be made that the multi-level data value is n. The upper and lower limits of the inequality (11) become the threshold.

$$\frac{V(n, P0) + V(n+1, P0)}{2} < V < \frac{V(n-1, P0) + V(n, P0)}{2} \quad (11)$$

When the pulse width is set in accordance with the present embodiment, a write power P0 is retrieved as the optimal write power from a lookup table stored in advance in the optical disk or the memory unit of the optical disk drive. Then, test data shown in FIG. 5 is write using the write power P0 and a write power PLO lower than P0. Then, the reflective light intensity corresponding to each multi-level data value is measured using each write power Pw. PLO may be set at PLO=0.85P0, but is not limited to this value.

In the case in which V(n,PLO) of a certain value n (n≧m/2) does not satisfy the following condition (12), write waveform to be used for writing the multi-level data value n is adjusted by extending the pulse width of the first top pulse, the pulse width of the second top pulse, or both, and test recording and reproduction is performed using the adjusted write waveform. According to the above arrangements, the recording mark can be certainly formed even using low write power, and reflection factor can be made close to that in the case in which the optimal write power is used. The adjustment of the pulse width is performed for each multi-level data value independently.

$$V(n, P_{LO}) < \frac{V(n-1, P0) + V(n, P0)}{2} \quad (12)$$

The above procedure is repeated until the condition (12) is satisfied by V(n,PLO) of all multi-level data values n. The determination about the lower limit of V(n,PLO) is not performed in the present embodiment because of the same reason as described above with respect to the method of setting pulse width (1).

According to the above arrangements, even if multi-level data is written as if the optimal write power is degraded to low write power PLO, the reflection factor obtained by reproducing each multi-level data value does not deviate from the range limited by the thresholds used for the reproduction of multi-level data written with the optimal write power. Therefore, all multi-level data values can be discriminated using a single set of thresholds that are obtained using the optimal write power, and it is not necessary to obtain another set of thresholds.

Alternatively, or additionally to the above methods of setting pulse width, the pulse width of the first top pulse, the pulse width of the second top pulse, or both may be adjusted such that multi-level data error rate SER obtained by test recording using write power PLO and subsequent reproduction satisfies SER(PLO)≦10⁻³. The adjustment can make the pulse width more appropriate. The test data used for the test recording is preferably random data.

The similar adjustment may be applied to the distance between the first top pulse and the second top pulse to improve recording performance.

Figure 19:
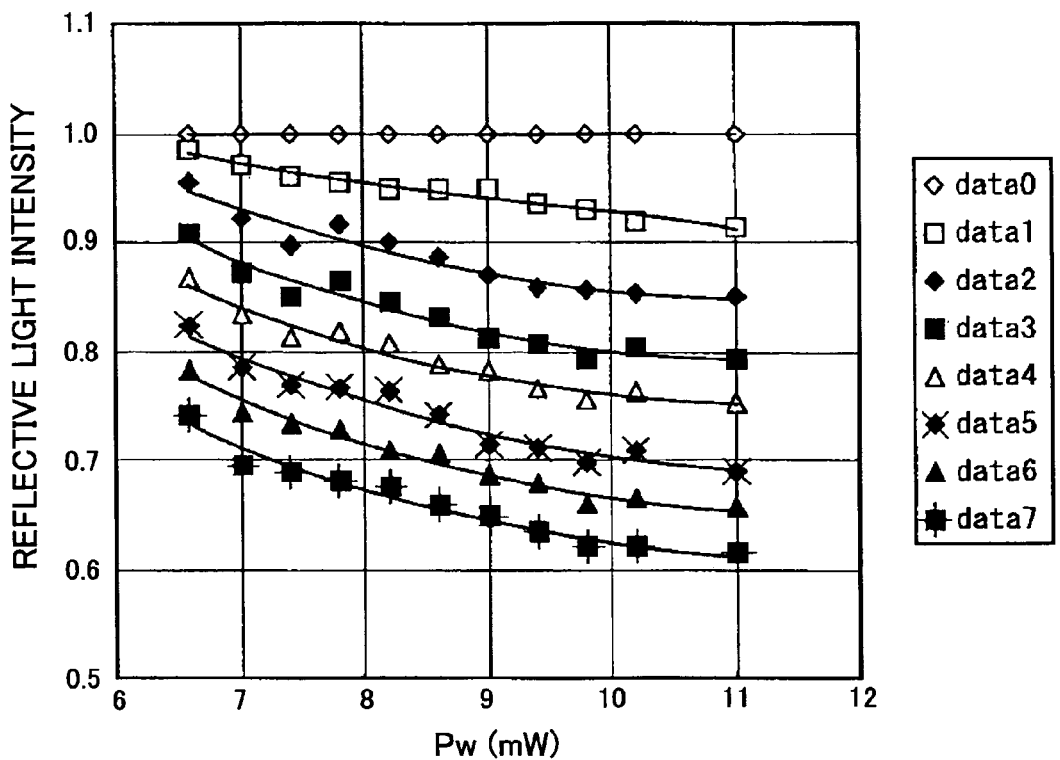
FIG. 19 is a graph showing the change of the reflective light intensity in the case test recording is performed changing write power Pw for multi-level data 0-7 using solitary wave pattern test data.

[First Variation of the First Embodiment: FIG. 19]

A first variation of the first embodiment is described below. Since the first variation is similar to the first embodiment described above, common description may be omitted. An information storage method according to the first variation is mainly different in that a determination of whether the second top pulse is inserted in the write waveform is made based on not only current multi-level data value but also preceding multi-level data value that has been written.

FIG. 19 is a graph showing the reflective light intensity corresponding to each multi-level data 0-7 as a function of write power Pw. Test data the reflective light intensity of which can be reproduced as a solitary wave having no inter-cell interference as shown in FIG. 14 was used. Write waveform used for the writing of any multi-level data value does not have the second top pulse but the first top pulse.

Unlike the result of test recording shown in FIG. 4, the result of the above test recording in FIG. 19 shows that, even in low write power region, the reflective light intensities corresponding to the multi-level data values 4-7 were not converged and crammed toward the same value. The cause of the difference between both results is considered to be the fact that, when the preceding multi-level data value zero is written, the recording layer has been pre-heated by the erase power used for the recording of the preceding multi-level data zero before the current multi-level data n=1-7 is written. Thus, even in low power region, the effect of insufficient heating is little.

The relation between the write power and the reflective light intensities corresponding to the multi-level data values 0-7 has been further studied. As a result of the study, it is understood that, in the case of the preceding multi-level data value being 0-3, the reflective light intensities corresponding to the current multi-level data values are diversified maintaining substantially equal distance with each other even in low write power region as shown in FIG. 19. However, in the case of the preceding multi-level data value being 4-7, the reflective light intensities corresponding to the current multi-level data values 4-7 steeply increase and are crammed to the substantially same value.

In this variation, if the current multi-level data value to be written is 4-7 (values the reflective light intensity in reproduction is low), the write waveform is selected further based on the preceding multi-level data value. That is, even in the case of the current multi-level data to be written being n=4-7, if the preceding multi-level data is 0-3 (values the reflective light intensity in reproduction is high), only the first top pulse is used as the top pulse of the write waveform, and if the preceding multi-level data is 4-7, the second top pulse is inserted. According to the above arrangements, excessive heating due to the insertion of the second top pulse can be avoided, which results in prohibiting the recording mark from excessively expanding in the radial directions. Additionally, thermal interference to adjacent track can be reduced.

Figure 20:
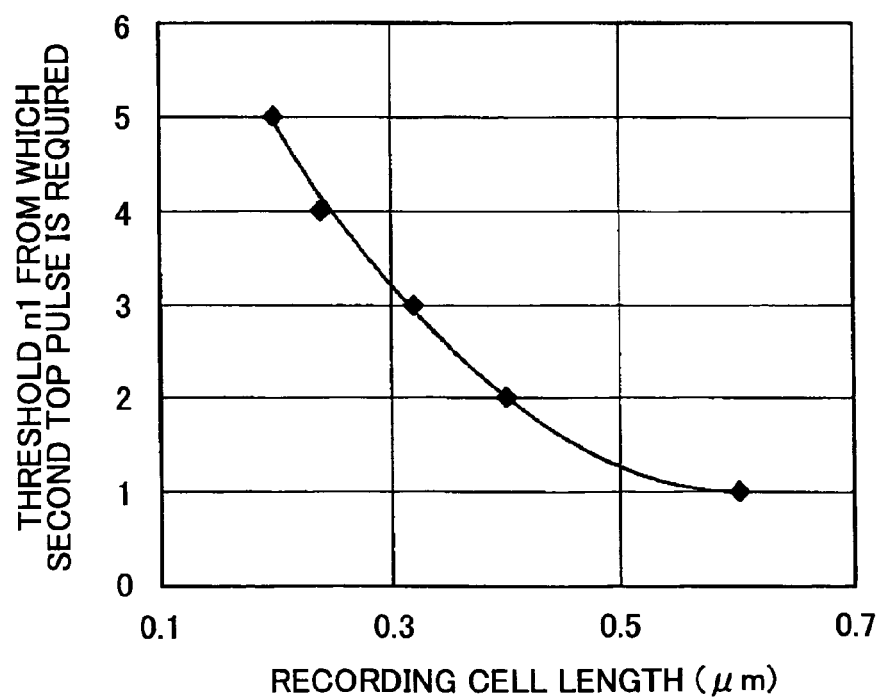
FIG. 20 is a graph showing the relation between the threshold value n1 that requires the second top pulse and the recording cell length CL.

[Second Variation of the First Embodiment: FIG. 20]

A second variation of the first embodiment is described below. Description common to the first embodiment and the first variation of the first embodiment is omitted in the following description of the second variation. The information storage method according to the second variation is different from those of the first embodiment and the first variation of the first embodiment in that the condition to determine whether the second top pulse needs to be inserted is further generalized with respect to the length of the recording mark and that of the recording cell.

As described with respect to the first embodiment, the second top pulse is inserted into the write waveform if the multi-level data value is the predetermined threshold m/2 (in this case=4). However, the threshold changes in dependence on the recording cell length. FIG. 4 shows that, in the case of low write power recording, the multi-level data that is 4 (threshold) or more is difficult to be discriminated due to little difference in reflective light intensity. This threshold changes as the recording cell length is varied.

FIG. 20 is a graph showing the relation between the threshold of multi-level data that requires the insertion of the second top pulse and the recording cell length obtained by a similar experiment to that of FIG. 4 for optical disks having various cell lengths. It is understood that the length of any recording mark is in a range of 0.08-0.16 μm as the result of measurement of the length of recording marks formed under the condition of each measuring point (shown as black diamond) using a transmission electron microscope. These lengths correspond to 15-30% of the diameter (1/e$^2$) Ds (=0.54 μm) of a light spot used for forming these recording marks. That is, it is understood that the insertion of the second top pulse is required in the case in which recording marks of (0.15-0.30)× Ds length are formed.

When m-level data is recorded, the ratio of the length ML of a recording mark formed for the multi-level data value n to the length CL of the recording cell is substantially equal to the ratio of n to m. Accordingly, the m-level data value that requires the insertion of a middle pulse can be expressed as n=(0.15-0.3)×Ds×m/CL. When a multi-level data value greater than n (longer mark) is written, the insertion of the second top pulse becomes requisite. The threshold of multi-level data value that requires the insertion of the second top pulse can be expressed as follows:

$$n_1 = \frac{\alpha \times Ds \times m}{CL} \quad (13)$$

where α being a factor 0.15≦α≦0.3.

The threshold n1 is computed by inserting 0.22, which is substantially a center value of the range, to α, and the same recording cell lengths CL as the samples used for the experiment shown in FIG. 20 to CL. As shown in the following table 1, the values computed by the equation (13) substantially match respective values obtained by the above experiment for any recording cell length. Values computed by the equation (13) is considered to be adequate.

TABLE 1

| RECORDING CELL LENGTH CL (μm) | EXPERIMENT | COMPUTATION |
|---|---|---|
| 0.20 | 5 | 5 |
| 0.24 | 4 | 4 |
| 0.32 | 3 | 3 |
| 0.40 | 2 | 2 |
| 0.60 | 1 | 2 |

[Second Embodiment of Information Storage Method: FIGS. 21-24]

An information storage method according to a second embodiment of the present invention is described below.

Description common to the first embodiment is omitted in the following description of the second embodiment. The information storage method according to the second embodiment is characterized in that recording linear velocity in recording of multi-level data is taken into consideration. This method is also suitable to multi-level data recording using constant angular velocity (CAV).

Generally, in the case in which the recording linear velocity is increased for high speed recording to an optical disk, the frequency of reference clock is increased unless the cell length is changed. In this case, if recording is performed using parameters suitably determined for recording of standard recording linear velocity, the pulse width of a write pulse is reduced. As a result, the temperature of the recording layer is not increased enough to form a recording mark of desired area. Additionally, because the emission of laser beam takes time to rise and fall, it becomes difficult to make the laser emission stable in the shortened emission cycle period.

In the case of a constant angular velocity (CAV) system, an optical disk is rotated at a constant angular velocity while recording is performed, and recording linear velocity in inner circumference region of the optical disk is different from that in outer circumference region of the optical disk. Therefore, the recording clock cycle is changed in dependence on the recording linear velocity (proportional to the recording linear velocity, for example) thereby to write multi-level data at constant recording linear density. The above problem may especially affect the CAV system.

Figure 21:
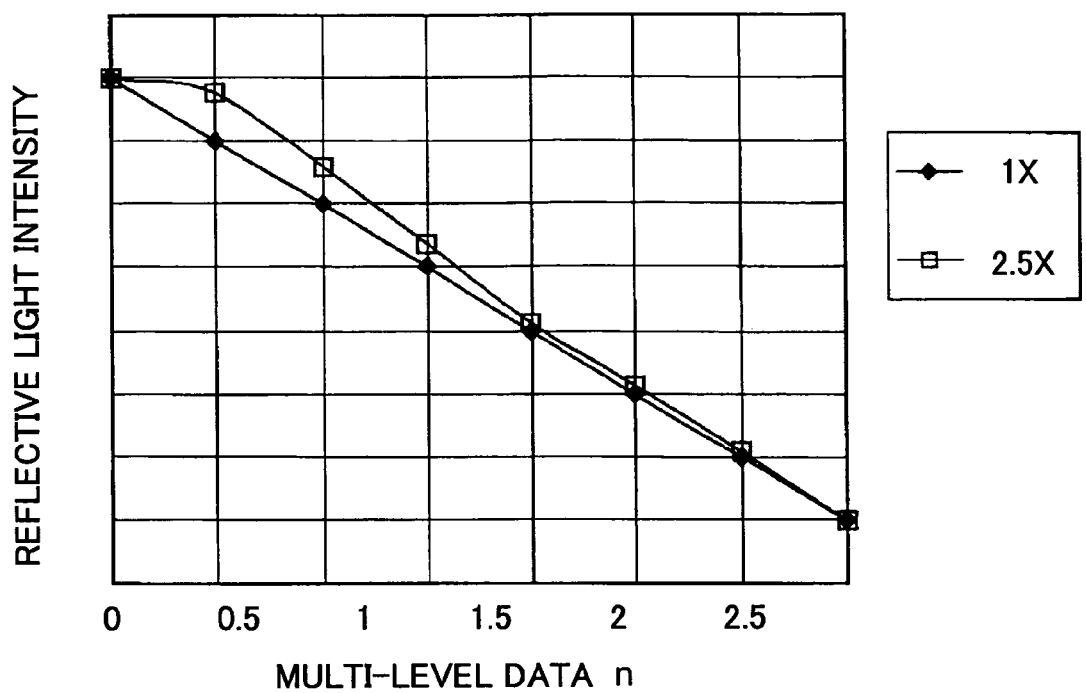
FIG. 21 is a graph showing the relation between multi-level data value n and the reflective light intensity comparing the case of recording using standard recording linear speed and the case of recording using 2.5 times the standard recording linear speed.

FIG. 21 is a graph showing the relation between the reflective light intensity and the multi-level data value comparing the case in which the multi-level data is written at standard recording linear velocity and the case in which the multi-level data is written at 2.5 times of recording linear velocity with the other parameters being the same.

This graph shows that, if the recording is performed at the standard recording linear velocity, the relation between the reflective light intensity and the multi-level data becomes substantially linear. However, even if the other parameters being unchanged, if the recording is performed at a higher linear velocity, the linearity between the reflective light intensity and the multi-level data is damaged since the reflective light intensities corresponding to some multi-level data values is not reduced enough. The multi-level data value that is the most affected is "1" that forms the shortest recording mark.

Accordingly, if the recording linear velocity is to be increased, adjustment may be preferably performed using higher energy. Even if the adjustment is not always performed, if the adjustment is performed when at least multi-level data "1" is written, the effect of the adjustment can be obtained.

Such adjustment may be performed, for example, by increasing, when the recording linear velocity is increased, the ratio (Ton/Toff) of the pulse width Ton of the top pulse and the pulse width Toff of the off pulse is increased. The increase of Ton/Toff can be achieved through the increase of Ton or the reduction of Toff, however, the increase of Ton is preferable for correct formation of a recording mark.

Accordingly, in the second embodiment, such adjustment is performed when storing information in an optical disk.

Figure 22:
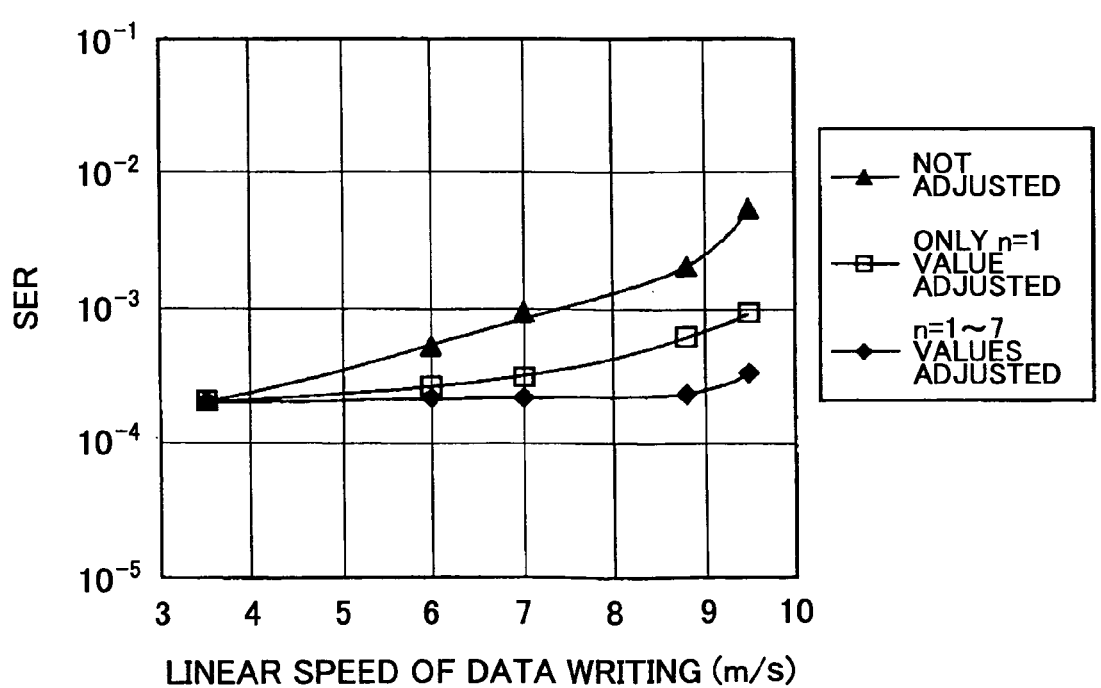
FIG. 22 is a graph showing the relation between the recording linear velocity and SER.

FIG. 22 is a graph showing the relation between SER and recording linear velocity comparing the cases such adjustment is performed and not.

This graph shows an experimental result in the case in which the standard recording linear velocity being 3.5 m/s, and the write waveform suitable for the 3.5 m/s recording linear velocity is used as a reference. Additionally, according to the intensive study by the inventor, it is understood that, if the second top pulse is provided in the write waveform, better adjustment can be made by increasing the ratio (Ton/Toff') between the pulse width Ton of the first top pulse and the pulse width Toff' of the first off pulse. It is further understood that better adjustment can be made by changing Ton/Toff or Ton/Toff' proportionally to the recording linear velocity. Specifically, the above condition was used in the experiment.

In the case in which the write waveform suitable for the recording at the standard recording linear velocity is used without any adjustment, SER increased beyond $10^{-3}$ at recording linear velocity 7.0 m/s that is twice the standard recording linear velocity, which results in unstable recording.

On the other hand, in the case the above adjustment was performed only for the writing of the multi-level data value "1", SER remained below $10^{-3}$ at 7.0 m/s that is twice the standard recording linear velocity. As a result, double speed recording is realized by adjusting the ratio Ton/Toff of the pulse width of the top pulse and the pulse width of the off pulse without changing the recording material of the optical disk.

Additionally, if Ton/Toff or Ton/Toff' is adjusted every time multi-level data n=1-7 is written, SER can be substantially prohibited from increasing up to 8.75 m/s which is t.5 times of the standard recording linear velocity, resulting in the extention of power margin.

Furthermore, in the case in which the ratios Ton/Toff or Ton/Toff' is optimized in dependence on the recording linear velocity every time multi-level data n=1-7 is written, a CAV system, the recording linear speed of which is 3.5 m/s at the most inner circumference (radial position 22 mm) of the recording range of an optical disk, realized SER of 10–3 or less up to the most outer circumference (radial position 58 mm).

Alternatively, or in addition to the above, the ratio Pe/Pw of the erase power Pe and the write power Pw may be reduced when the recording linear velocity is increased. In this case, since the maximum power of a semiconductor laser is limited, the ratio Pe/Pw is preferably reduced by reducing the erase power Pe. The ratio may be changed inversely proportional to the recording linear velocity. The adjustment of the ratio Pe/Pw realized the similar effect to the adjustment of Ton/Toff.

Figure 23A:
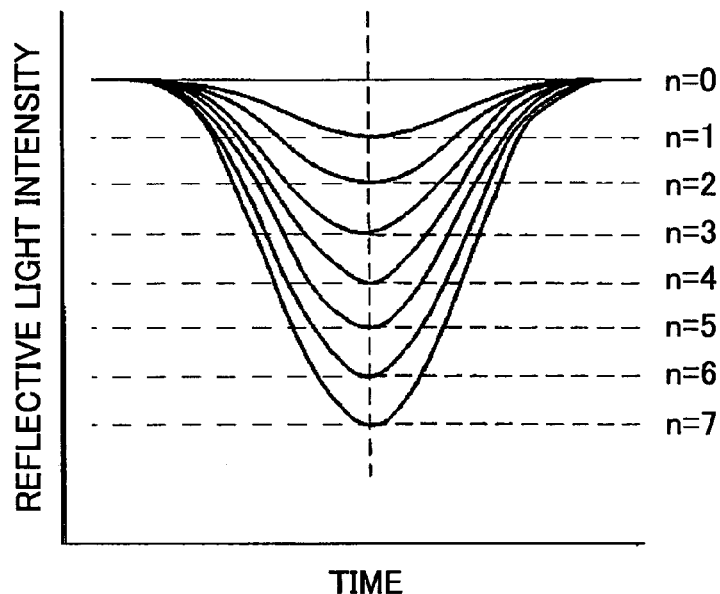
FIGS. 23A and 23B are schematic diagrams showing waveforms of reproduction signals in the case of the solitary wave of multi-level data 0-7 written by the recording linear velocity 3.5 m/s and 7.0 m/s, respectively, is reproduced.
Figure 23B:
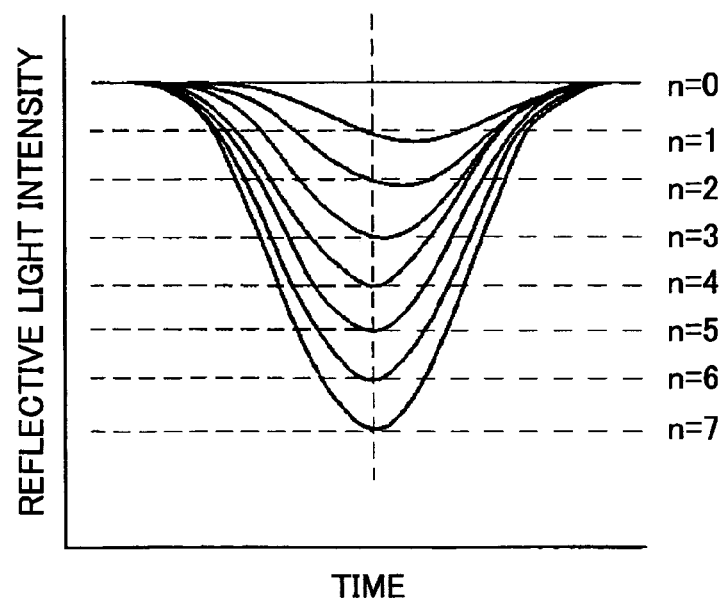

By the way, in the case of increasing the recording linear velocity, the deviation of position at which the recording mark is formed may matter. FIGS. 23A and 23B show the waveforms of reproduction signals obtained by reproducing the solitary wave of multi-level data 0-7 written at recording linear velocity 3.5 m/s and 7.0 m/s, respectively.

FIG. 23A shows that, in the case of the recording linear velocity 3.5 m/s, the peak position of each solitary wave substantially matches the sampling position (the peak position of multi-value data "7") indicated by a broken line.

However, FIG. 23B shows that, in the case of the recording linear velocity 7.0 m/s, the peak positions corresponding multi-value data 1-3 are deviated from the sampling position shifting to the right (recording direction). The deviation of the peak position corresponding to multi-level data "1" having the shortest recording mark is the greatest. Even if the recording mark having of desired size is formed, the recording mark can not be read correctly because the amplitude at the sampling position is not the peak value.

Figure 24A:
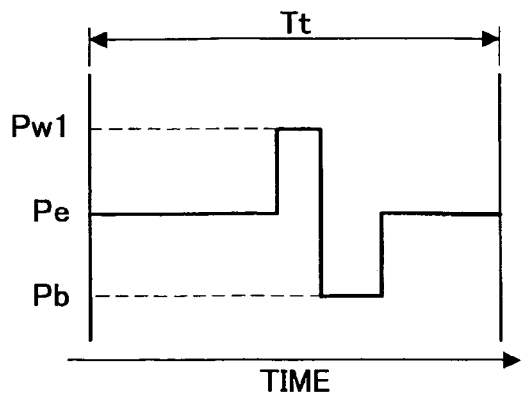
FIGS. 24A and 24B are schematic diagrams for explaining the adjustment write timing to adjust the deviation of position at which a recording mark is formed.
Figure 24B:
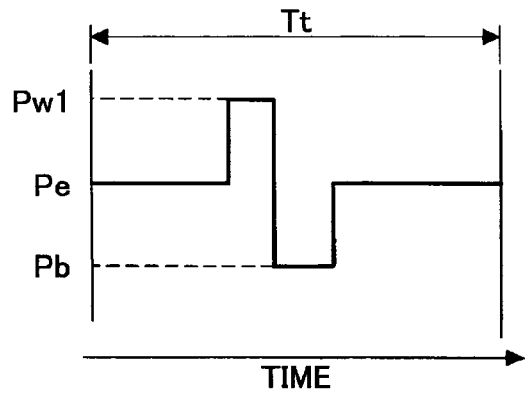
Figure 25:
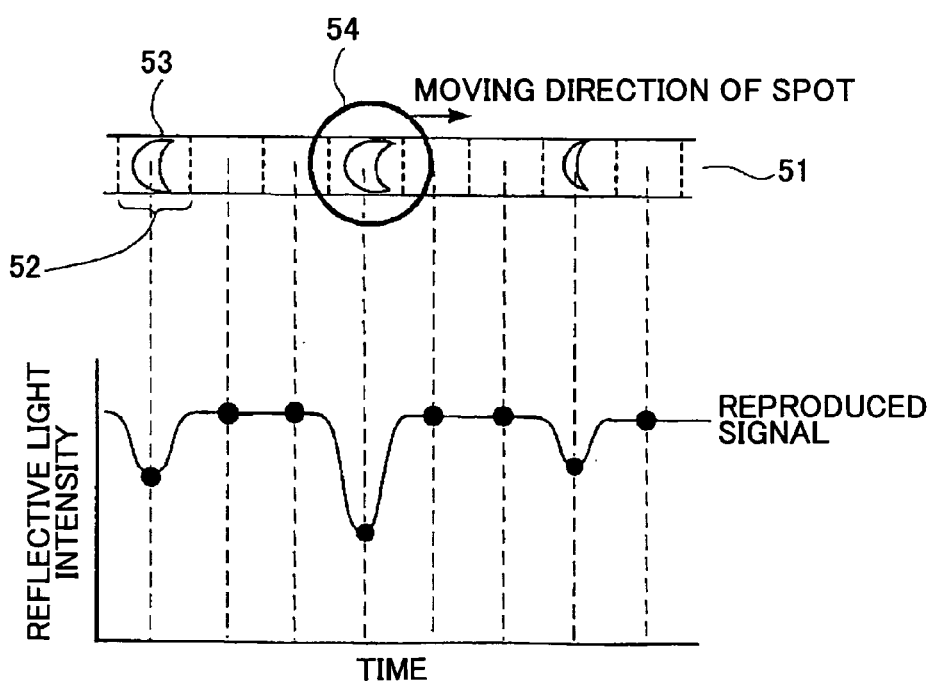
FIG. 25 is a schematic diagram for explaining the relation between the condition of a recording mark formed in each cell and the reflective light intensity in the case of multi-level recording.
Figure 26:
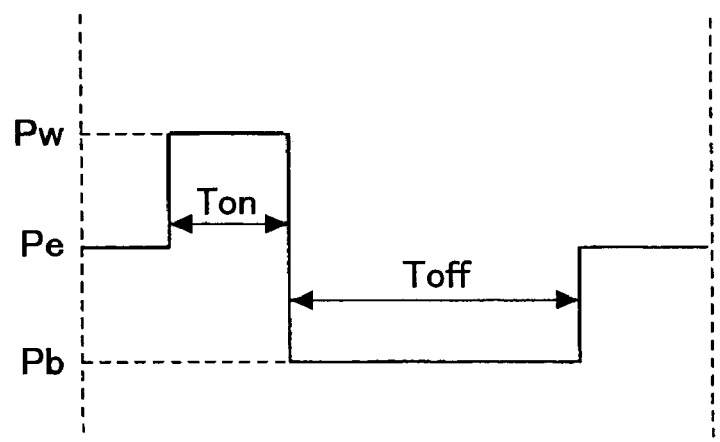
FIG. 26 is a schematic diagram showing conventional write waveform with which multi-level data is written to an optical disk.

To solve the above problem, in the case in which recording is performed at high recording linear velocity, at least multi-level data (in this case "1") corresponding to the smallest recording mark may preferably be written using the write waveform in which the timing at which each pulse is generated is advanced compared to the other multi-level data. For example, the top pulse of write power Pw and the off pulse of bias power Pb shown in FIG. 24A may be advanced as shown in FIG. 24B without changing waveform. According to the above arrangements, the position at which the recording mark is formed can be shifted forward in the recording cell, which results in the peak position of reproduction signal being matched to the sampling position and the linearity of each reflective light intensity being maintained.

The information storage medium such as an optical disk used for the present invention may be preferably phase change type. Such information storage medium may have a recording layer made of the following materials, for example, but not limited to: Ge—Sb—Te, Ge—Te—Sb—S, Te—Ge—Sn—Au, Ge—Te—Sn, Sb—Se, Sb—Se—Te, Sn—Se—Te, Ga—Se—Te, Ga—Se—Te—Ge, In—Se, In—Se—Te, and Ag—In—Sb—Te, for example. These materials can be set at amorphous phase and crystal phase if rapidly cooled and gradually cooled, respectively.

The preferred embodiments of the present invention are described above. The present invention is not limited to these embodiments, but variations and modifications may be made without departing from the scope of the present invention.

This patent application is based on Japanese priority patent applications No. 2004-79283 filed on Mar. 18, 2004, and No. 2004-325608 filed on Nov. 9, 2004, the entire contents of which are hereby incorporated by reference.

What is claimed is:

1. A method of writing multi-level data to a recording medium by the emission of light beam, wherein
a write waveform that controls the emission of the light beam includes a first top pulse, an off pulse, and an erase pulse; and
if the value of the multi-level data falls in a predetermined range, a second top pulse is inserted between the first top pulse and the erase pulse of the write waveform that controls the emission of the light beam to write the value; and
at least two values of the multi-level data are associated with a write waveform containing the same number of top pulses, and
a determination is made of whether the second top pulse is inserted or not to the write waveform in dependence on the value of immediately preceding multi-level data that has been written.

2. The method as claimed in claim 1, wherein the predetermined range is a range of the value of the multi-level data, the reflective light intensity from the recording mark corresponding to the value of the multi-level data being included in a lower half thereof.

3. The method as claimed in claim 1, wherein the predetermined range is a range of $n \geq \alpha \times Ds \times m/CL$, where n being the value of the multi-level data, $\alpha$ being a constant $0.15 \leq a \leq 0.30$, Ds being the spot diameter of the light beam on the recording surface of the recording medium, m being the number of values of the multi-level data, and CL being the length of a recording cell in recording directions, the recording cell being the unit area of the recording surface of the recording medium in which the multi-level data is written.

4. The method as claimed in claim 1, wherein the reflective light intensity corresponding to the value of the multi-level data is adjusted by a time period between the first top pulse and the second top pulse.

5. The method as claimed in claim 1, wherein the reflective light intensity corresponding to the value of the multi-level data is adjusted by a time period between the first top pulse and the second top pulse, a time period between the second top pulse and the erase pulse, or both.

6. The method as claimed in claim 1, wherein the reflective light intensity corresponding to the value of the multi-level data is adjusted by the pulse width of the first top pulse, the pulse width of the second top pulse, or both.

7. The method as claimed in claim 1, wherein the pulse width of the first top pulse and the pulse width of the second top pulse are determined such that the following condition is satisfied by the values of the multi-level data falling the predetermined range:

$$V(n, PLO) \leq V(0, P0) + (2n-1) \times [V(m-1), P0] - V(0, P0)]/[2(m-1)],$$

where P0 being write power used for writing the multi-level data, PLO being write power lower than P0, V(n, Pw) being the reflective light intensity of multi-level data n detected in the case in which predetermined test data written using the write power Pw is read, m being the number of values of the multi-level data.

8. The method as claimed in claim 1, wherein the pulse width of the first top pulse and the pulse width of the second top pulse are determined such that the following condition is satisfied by the values of the multi-level data falling the predetermined range: V(n, PLO)<[V(n−1, P0)+V(n, P0)]/2, where P0 being write power used for writing the multi-level data, PLO being write power lower than P0, V(n, Pw) being the reflective light intensity of multi-level data n detected in the case in which predetermined test data written using the write power Pw is read.

9. The method as claimed in claim 1, wherein the pulse width of the first top pulse and the pulse width of the second top pulse are determined such that the following condition is satisfied by the values of the multi-level data falling the predetermined range:

$$SER(Pw) \leq 10^{-3},$$

where P0 being write power used for writing the multi-level data, PLO being write power lower than P0, SER(Pw) being the multi-level data error rate detected in the case in which predetermined test data written using the write power Pw is read.

10. The method as claimed in claim 7, wherein the write power P0 is determined based on write power the information of which is recorded in the recording medium in advance.

11. The method as claimed in claim 7, wherein the pulse width of the first top pulse and the pulse width of the second top pulse determined are stored in the recording medium, and when the pulse width of the first top pulse and the pulse width of the second top pulse are to be determined next time, the pulse width of the first top pulse and the pulse width of the second top pulse stored in the recording medium are read and used as initial values.

12. The method as claimed in claim 1, wherein the pulse width of the second top pulse is determined to be less than the pulse width of the first top pulse.

13. The method as claimed in claim 1, wherein the write power level of the second top pulse is determined to be lower than the write power level of the first top pulse.

14. The method as claimed in claim 1, wherein, when multi-level data is written at a constant recording linear density by varying recording clock cycle in dependence on recording linear velocity, if at least a value corresponding to the smallest recording mark is written, a ratio Ton/Toff is increased as the recording linear velocity is increased, where Ton being the pulse width of the first top pulse and Toff being the time period in which the light beam is irradiated at the bias power level.

15. The method as claimed in claim 14, wherein the ratio Ton/Toff is increased by extending Ton as the recording linear velocity is increased.

16. The method as claimed in claim 1, wherein, when multi-level data is written at a constant recording linear density by varying recording clock cycle in dependence on recording linear velocity, if at least a value corresponding to the smallest recording mark is written, a ratio Pe/Pw1 is reduced as the recording linear velocity is increased, where Pe being the erase power level of the erase pulse and Pw1 being the write power level of the first top pulse.

17. The method as claimed in claim 16, wherein the ratio Pe/Pw1 is varied by increasing Pe.

18. The method as claimed in claim 14, wherein the pulses for writing multi-level data corresponding to the smallest recording mark are generated at earlier timing than the pulses for writing multi-level data corresponding to other recording marks are generated.

19. An information storage apparatus for writing multi-level data to a recording medium by the emission of light beam, comprising:

a control unit that controls the emission of the light beam through write waveform including a first top pulse, an off pulse, and an erase pulse, wherein if the value of the multi-level data falls in a predetermined range, the control unit inserts a second top pulse between the first top pulse and the erase pulse of the write waveform to control the emission of the light beam to write the value, and wherein the control unit uses a write waveform containing the same number of top pulses to represent at least two values, and wherein the apparatus is arranged to make a determination of whether the second top pulse is inserted or not to the write waveform in dependence on the value of immediately preceding multi-level data that has been written.

20. A recording medium in which multi-level data is written using a writing method with a write waveform that controls the emission of a alight beam, the write waveform including a first top pulse, an off pulse, and an erase pulse, and if the value of the multi-level data falls in a predetermined range, a second top pulse is inserted between the first top pulse and the erase pulse of the write waveform that controls the emission of the light beam to write the value, and at least two values of the multi-level data are associated with a write waveform containing the same number of top pulses, and wherein parameters that define the write waveform for writing the multi-level data are pre-recorded, and the parameters at least include parameters that indicates the write waveform in which the second top pulse has been inserted, and wherein a determination is made of whether the second top pulse is inserted or not to the write waveform in dependence on the value of immediately preceding multi-level data that has been written.

21. The recording medium as claimed in claim 20, wherein the recording medium is a phase change type optical disk comprising a phase change recording layer.

* * * * *